(12) United States Patent
Taylor et al.

(10) Patent No.: US 12,122,005 B2
(45) Date of Patent: Oct. 22, 2024

(54) TOOLING BASE

(71) Applicant: 5th Axis Inc., San Diego, CA (US)

(72) Inventors: Chris Taylor, San Diego, CA (US);
Steve Grangetto, San Diego, CA (US);
Adam Lane, San Diego, CA (US)

(73) Assignee: 5th Axis Inc., San Diego, CA (US)

( * ) Notice: Subject to any disclaimer, the term of this patent is extended or adjusted under 35 U.S.C. 154(b) by 209 days.

(21) Appl. No.: 17/812,548

(22) Filed: Jul. 14, 2022

(65) Prior Publication Data

US 2023/0017767 A1 Jan. 19, 2023

Related U.S. Application Data

(60) Provisional application No. 63/222,512, filed on Jul. 16, 2021.

(51) Int. Cl.
*B23Q 1/46* (2006.01)
*B23Q 3/10* (2006.01)
*B25B 5/00* (2006.01)
*F16B 2/18* (2006.01)

(52) U.S. Cl.
CPC ............... *B23Q 1/46* (2013.01); *B23Q 3/102* (2013.01); *B23Q 3/103* (2013.01); *B25B 5/006* (2013.01); *F16B 2/185* (2013.01)

(58) Field of Classification Search
CPC ...... B23Q 1/0072; B23Q 3/066; B23Q 3/102; B23Q 3/103; B23Q 3/108; B23Q 3/107; B25B 5/006; Y10T 279/17162; Y10T 279/17136
See application file for complete search history.

(56) References Cited

U.S. PATENT DOCUMENTS 9,902,033 B1 * 2/2018 Taylor .................. B23Q 1/0072

* cited by examiner

*Primary Examiner* — Tyrone V Hall, Jr.
(74) *Attorney, Agent, or Firm* — Bookoff McAndrews, PLLC

(57) ABSTRACT

An improved tooling, including: a base housing having an interior and tooling holes, the tooling holes being configured to receive alignment studs attached to a tooling fixture; a first clamping fixture and a second clamping fixture fit inside hollowed regions within the base housing; a shaft having a length and an axis along the length of the shaft, the shaft situated inside the base housing and the shaft having a first threaded region and a second threaded region to connect the first clamping fixture and the second clamping fixture, whereby rotation of the shaft causes the first clamping fixture and the second clamping fixture to move towards and away from each other along the axis of the shaft; each of the first clamping fixture and the second clamping fixture comprising one or more securing mechanisms configured to: engage and disengage the alignment studs based upon rotation of the shaft.

19 Claims, 19 Drawing Sheets

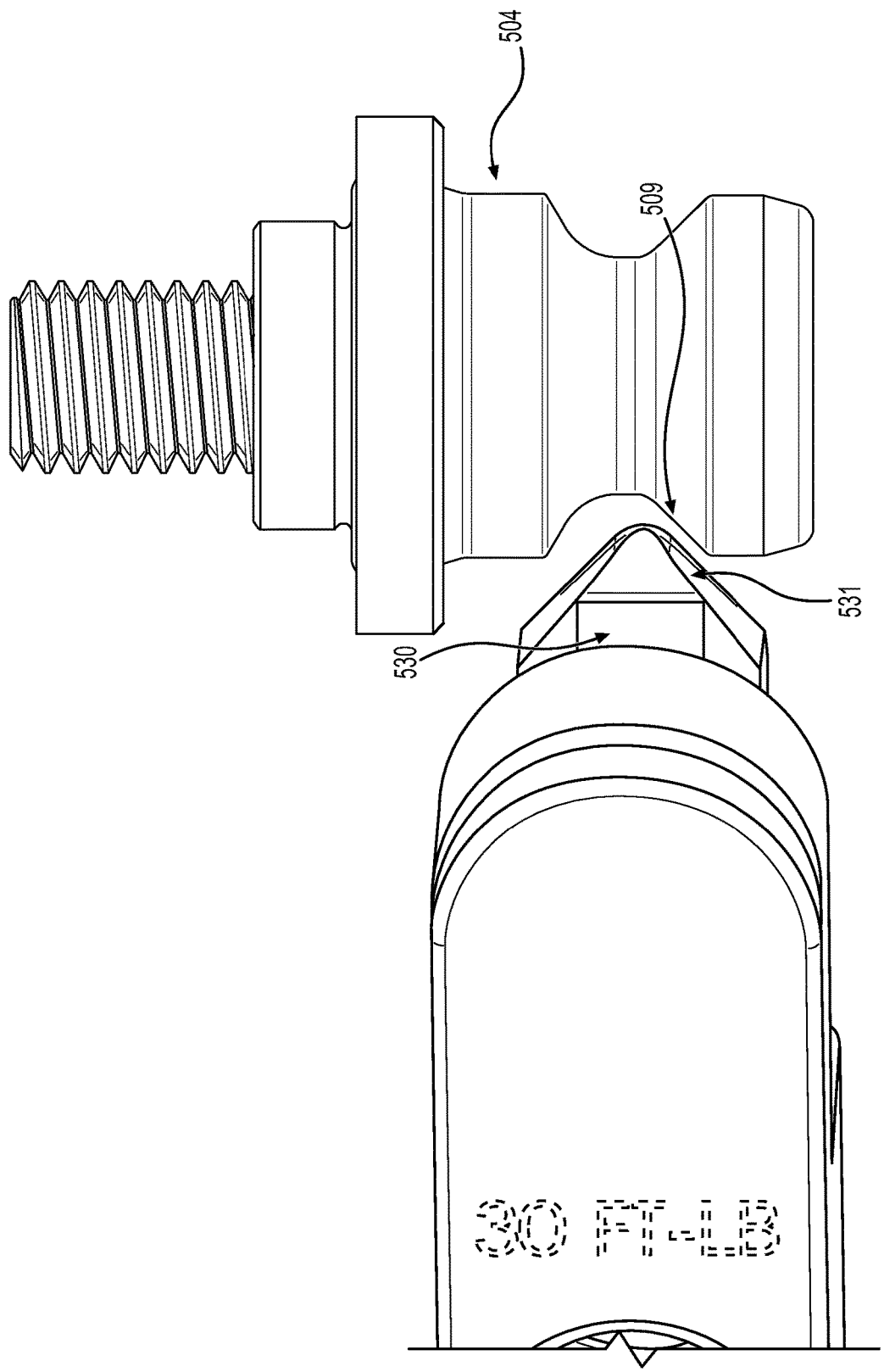

TOOLING BASE

CROSS-REFERENCE TO RELATED APPLICATIONS

This application claims the benefit of priority from U.S. Provisional Patent Application No. 63/222,512, filed Jul. 16, 2021, which is hereby incorporated by reference herein in its entirety.

TECHNICAL FIELD

Aspects of the present disclosure relate generally to tooling bases that are used to attach a variety of tooling fixtures that would hold a work piece to a work surface for machining, and, more specifically, to embodiments of tooling bases that allow the fixtures and work pieces to be removed and re-attached while maintaining machining accuracy.

BACKGROUND

A tooling fixture is used to hold a work piece during intricate machining such as 5-axis machining. The fixture system requires that the work piece be held securely and precisely and provides access to a machine tool to all facets of the work piece. Preferably, it is possible to prepare the raw stock and easily and removably mount the stock in the fixture to present to a machine to create a part. Often, tooling fixtures are mounted directly to the bed or work surface of the milling machine. However, in many cases, it is necessary to process a part on different machines, requiring the part to be removed from one machine, worked or processed elsewhere and returned to the first machine. It is important that upon reinstallation, the registration of the part to the tooling fixture to the machine is maintained to very tight tolerances. A solution to this problem is a tooling base.

The present disclosure is accordingly directed to an improved tooling base. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for enabling users to plan trips and optimize experiences on those trips based around aspects of their favorite article of multimedia content.

In one aspect, a tooling base for removably aligning and attaching a tooling fixture to a work surface of a machine including: a base housing having an interior and tooling holes, the tooling holes being configured to receive alignment studs attached to the tooling fixture, wherein each of the alignment studs comprise an indentation; a first clamping fixture fit inside a first hollowed region within the base housing and including a first threaded hole, and a second clamping fixture fit inside a second hollowed region within the base housing and including a second threaded hole; a shaft having a length and an axis along the length of the shaft, the shaft situated inside the base housing and the shaft having a first threaded region and a second threaded region, wherein the first threaded region fits inside the first threaded hole of the first clamping fixture, and the second threaded region fits inside the second threaded hole of the second clamping fixture, whereby: rotation of the shaft in a first direction causes the first clamping fixture and the second clamping fixture to move towards each other along the axis of the shaft; and rotation of the shaft in a second direction causes the first clamping fixture and the second clamping fixture to move away from each other along the axis of the shaft, the second direction being different from the first direction; each of the first clamping fixture and the second clamping fixture comprising one or more securing mechanisms configured to: engage the indentation on the alignment studs of the tooling fixture upon rotation of the shaft in the first direction, thereby securing the alignment studs within the tooling holes and clamping the tooling fixture to the base housing; and disengage the indentation on the alignment studs of the tooling fixture upon rotation of the shaft in the second direction, thereby releasing the alignment studs within the tooling holes and unclamping the tooling fixture from the base housing.

In another aspect, a tooling base for removably aligning and attaching a tooling fixture to a work surface of a machine including: a base housing having an interior and tooling holes, the tooling holes being configured to receive alignment studs attached to the tooling fixture, wherein each of the alignment studs comprise an indentation; a first clamping fixture fit inside a first hollowed region within the base housing and including a first threaded hole, and a second clamping fixture fit inside a second hollowed region within the base housing and including a second threaded hole; a shaft having a length and an axis along the length of the shaft, the shaft situated inside the interior of the base housing and the shaft having a first threaded region and a second threaded region, wherein the first threaded region fits inside the first threaded hole and the second threaded region fits inside the second threaded hole, whereby: rotation of the shaft in a first direction causes the first clamping fixture and the second clamping fixture to move along the axis of the shaft towards each other; and rotation of the shaft in a second direction causes the first clamping fixture and the second clamping fixture to move along the axis of the shaft away from each other; each of the first clamping fixture and the second clamping fixture comprising one or more securing mechanisms configured to: engage with an engagement surface of the indentation on the alignment studs with a stud engagement surface of the securing mechanisms upon rotation of the shaft in the first direction, thereby securing the alignment studs within the tooling holes and clamping the tooling fixture to the base housing; and disengage with the engagement surface of the indentation on the alignment studs of the tooling fixture upon rotation of the shaft in the second direction, thereby freeing the alignment studs within the tooling holes and unclamping the tooling fixture from the base housing.

In yet another aspect, a clamp and release component for securing an object comprising: a first clamping fixture shaped to fit inside a first hollowed region of a housing and a second clamping fixture shaped to fit inside a second hollowed region of the housing, wherein the first clamping fixture comprises a first threaded hole and wherein the second clamping fixture comprises a second threaded hole; a shaft having a length and an axis along the length of the shaft, the shaft being insertable into an interior of the housing and the shaft having a first threaded region configured to fit inside the first threaded hole and a second threaded region configured to fit inside the second threaded hole; and each of the first clamping fixture and the second clamping fixture comprising one or more movable securing mechanisms comprising a stud engagement surface.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate the disclosed embodiments, and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure. In the drawings:

FIG. 7A depicts a perspective view of an alignment stud and clamping lever, according to various aspects of the present disclosure.

DETAILED DESCRIPTION OF THE EMBODIMENTS

Figure 1:
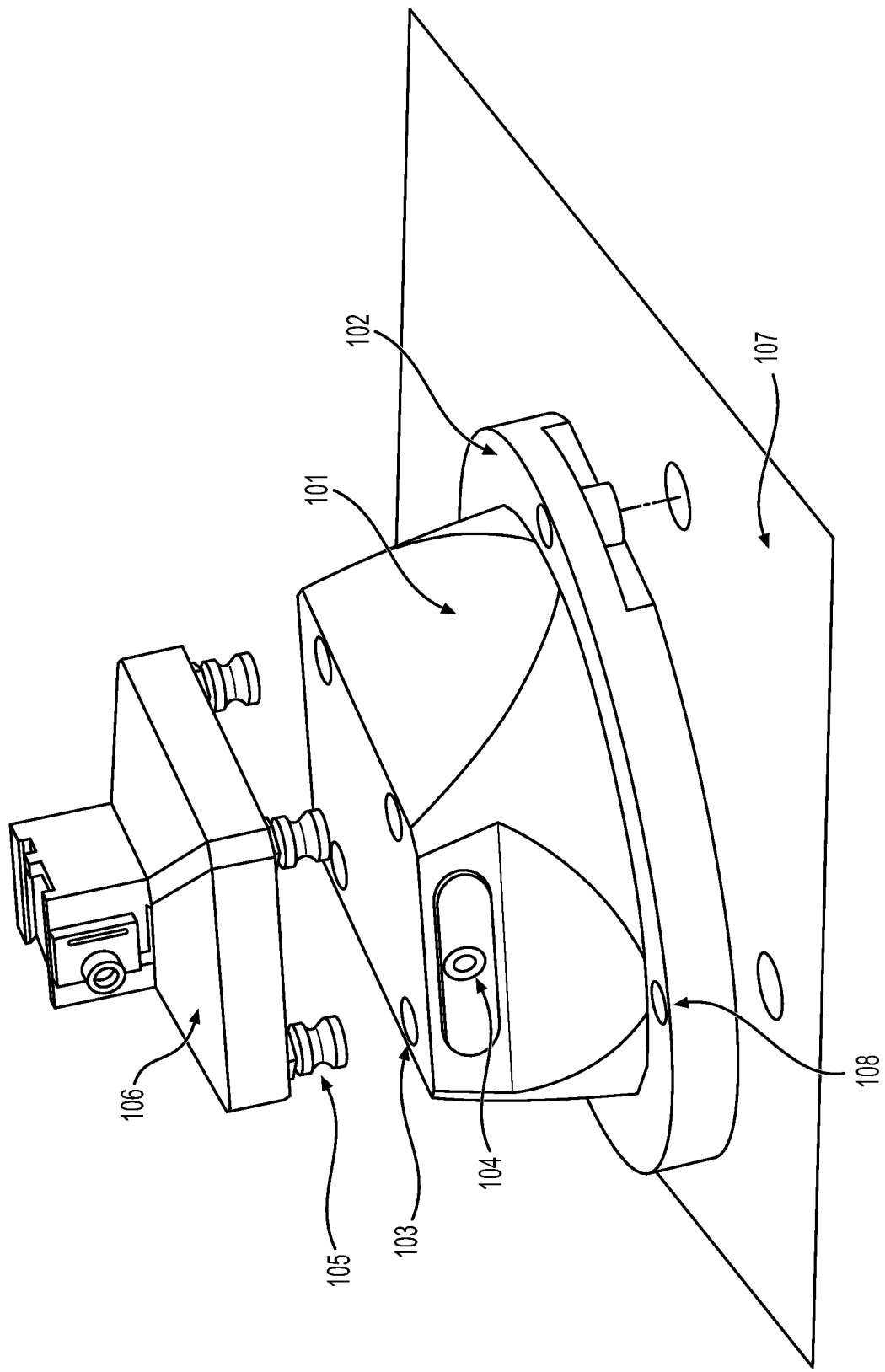
FIG. 1 depicts a top perspective view of an exemplary tooling fixture as it would attach to a tooling base, according to various aspects of the present disclosure.

Both the foregoing general description and the following detailed description are exemplary and explanatory only and are not restrictive of the features, as claimed. As used herein, the terms "comprises," "comprising," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges mean the value, limit, and/or range +/−10%.

In general, a tooling base is a system that attaches to a milling or other machining device and is precisely registered to that device. A vise or other fixture is then attached to the tooling base, again with precise registration to the tooling base, and therefore to the machining device. The tooling base further provides means to detach and re-attach a tooling fixture while maintaining precise registration. Tooling bases are known, such as those described in U.S. Pat. Nos. 9,902,033; 8,708,323; 10,603,750; U.S. Pat. Pub. No. 2007/0187909; German Pat. No. DE1011748564; International Pat. Pub. No. WO 2000/053361A1; Japanese Pat. No. JP3085607B2; Japanese Pat. App. Laid Open No. Jitsu-Kai-Hei 5-26283U; and Japanese Pat. App. Laid Open No. Jitsu-Kai-Hei 5-56308U.

Conventional tooling base designs are fraught with a variety of issues. For example, in some implementations, precision parts of the tooling base are designed such that they require machining, heat treatment, and then additional machining after heat treatment to compensate for dimensional changes during heat treatment. Such a process may be difficult and time-consuming to complete. Additionally, as another example, the mechanism that is used to clamp and release the tooling fixture to the base is composed of a large number of precision parts that require multiple surfaces to fit together to ensure precise registration. The complexity of this mechanism adds to the completion time and drives up the cost of manufacture. Furthermore, conventional tooling bases are not designed to optimize the pull-down force on the tooling fixture.

Accordingly, a need exists for an improved design in tooling bases that are easy to manufacture, have few(er) parts, and still maintain precise registration of the tooling fixture to the tooling base and the tooling base to the machine, and enable removal and reattachment of the tooling fixture. There is a need for a tooling base that can be easily adapted to precisely locate a plurality of types and numbers of tooling fixtures. There is further a need for a tooling base that can apply an improved pull down force to maintain a better hold on work pieces.

Reference will now be made in detail to the exemplary embodiments of the present disclosure described below and illustrated in the accompanying drawings. Wherever possible, the same reference numbers will be used throughout the drawings to refer to same or like parts.

Additional objects and advantages of the embodiments will be set forth in part in the description that follows, and in part will be obvious from the description, or may be learned by practice of the embodiments. It is to be understood that both the foregoing general description and the following detailed description are exemplary and explanatory only and are not restrictive of the claims.

Referring to FIG. 1, a tooling fixture 106 and a tooling base 101 are shown. The tooling base 101 comprises a base platform 102 that is attached to the work surface 107 of a milling or other processing machine that requires precise registration. The attachment is through use of alignment pins and bolt holes 108, as are known in the art. The base further includes a plurality of registration holes 103 into which alignment studs 105 are inserted. A screw socket 104 is turned that operates an internal clamp to clamp the alignment studs 105 in the tooling holes 103 and thereby register the tooling fixture 106 to the base. The base 102 is registered to the milling or other processing machine using tooling pins (not shown) and bolts (not shown), as are known in the art. The tooling fixture 106 may be removed by actuating the screw socket 104 and lifting from the tooling base. The tooling base 101 remains clamped and registered to the processing machine. The fixture 106 may be reinserted to the base, and, upon actuating the screw socket 104, is clamped via the alignment studs 105 to the tooling base and registration to the base is renewed. The tooling fixture may therefore be repeatedly attached to and removed from the tooling base and each time of reattachment, registration is maintained.

Figure 2:
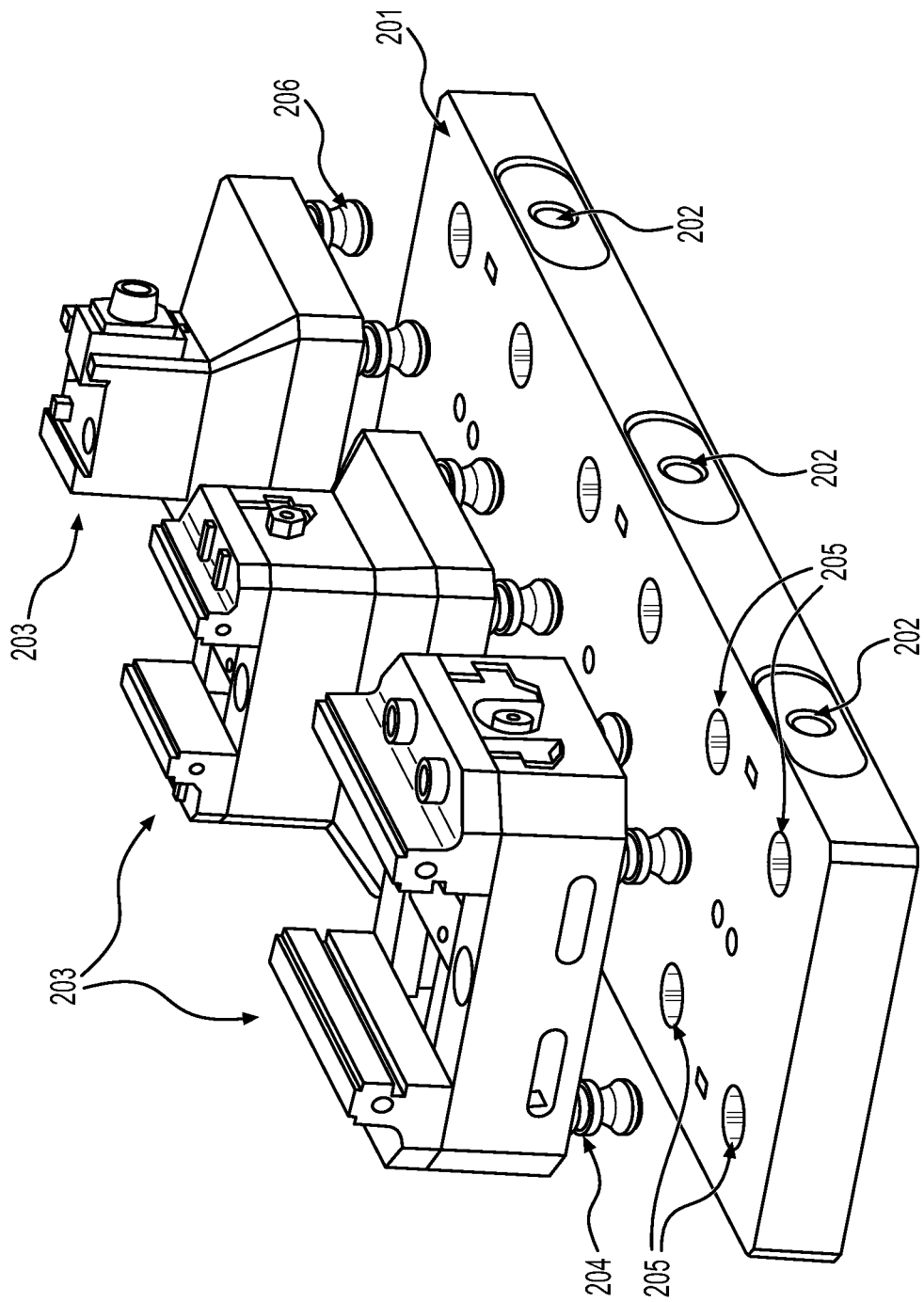
FIG. 2 depicts an exemplary tooling base that accommodates a plurality of tooling fixtures, according to various aspects of the present disclosure.

Referring to FIG. 2, an exemplary tooling base 201 is illustrated that includes positions to attach a plurality of tooling fixtures 203. The tooling fixtures need not all be identical. The tooling fixtures each include tooling holes (not visible) to which are attached the alignment studs 204 that include an indentation 206 that is engaged by the internal clamping fixtures (not visible in FIG. 2) when the screw sockets 202 are actuated. Each of the tooling fixtures 203 may thereby be independently clamped to and removed from the tooling base 202. The tooling base 202 can include a variety of configurations (compare FIGS. 1 and 2) and hold a plurality of tooling fixtures 203 also having a variety of configurations.

Figure 3A:
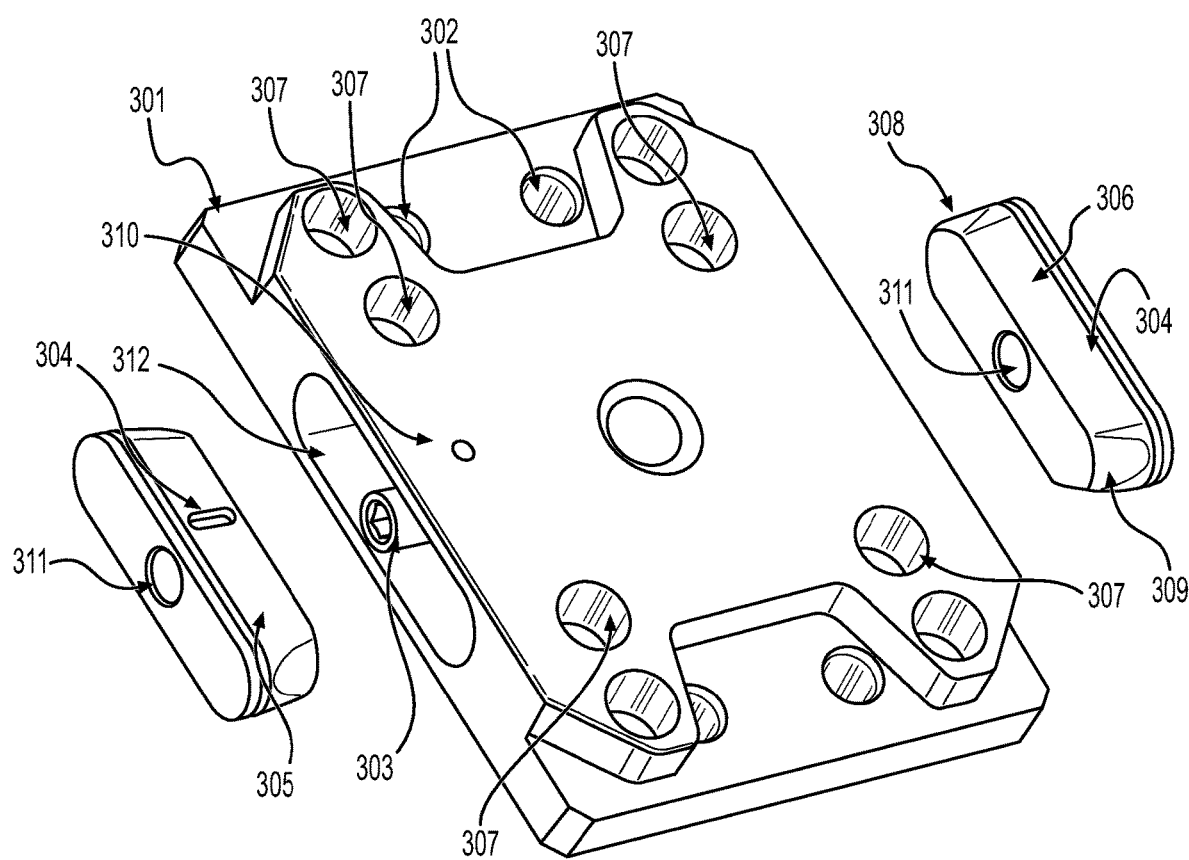
FIG. 3A depicts additional detail of the parts of an exemplary tooling base, according to various aspects of the present disclosure.

Referring now to FIG. 3A, another configuration of the tooling base is illustrated with a clamping mechanism. The tooling base 301 is comprised of tooling pins (not shown) and bolt holes 302 that are used to clamp the tooling base 301 to the work surface of a milling machine or other processing device. Note, in another embodiment, a plurality of bases may be stacked. The tooling base 301 of FIG. 3A can be one of the several fixtures 203 attached to the base 201 of FIG. 2. The tooling base 301 further includes clamping fixtures 305, 306 that fit inside hollow slot 312, such that the fixtures 305, 306 are moveable towards and away from each other within the slot. The fixtures 305, 306 each include a threaded hole 311 that fits to the threaded shaft 303. Turning of the threaded shaft 303 causes the clamping fixtures to move either towards one another or away from one another. When moving towards one another, the fixtures 305, 306 move to clamp alignment studs (not shown) within the tooling holes 307, thereby aligning a fixture attached to the alignment studs to the tooling base. In this embodiment the clamping fixtures each further include a slot 304 into which fits a pin 310. The pin 310 and the slot 304 act as a stop. The fixtures attached to the threaded shaft 303 are free to move within the hollow slot 312 in a direction parallel to the threaded shaft 303 over a distance that is the length of the slot 304. As the shaft 304 is rotated in a first direction, the fixtures are pulled towards one another by rotation of the threaded shaft 303 in the threaded holes 311. The tapered ends 308, 309 on each of the fixtures (ends on only one fixture are labeled) engage the indentation and clamp the alignment studs against the wall of the tooling holes 307, and thereby align the fixture (not shown) to the base. Rotation of the threaded shaft 303 in a second direction, opposite to that of the first direction causes the alignment fixtures to move apart, thereby releasing the alignment studs from the tooling holes. In one embodiment the tooling base is made of steel.

Figure 3B:
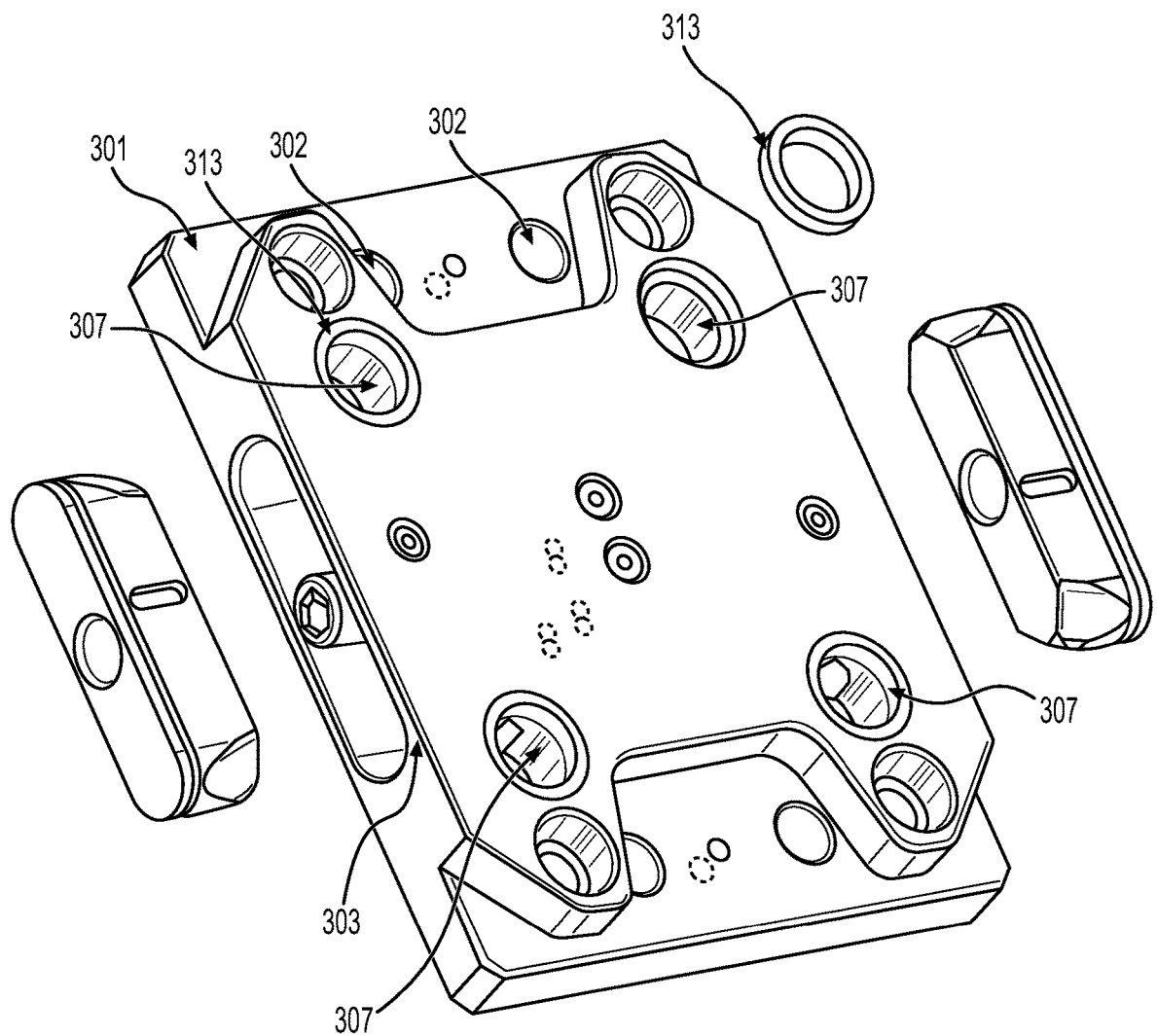
FIG. 3B depicts the exemplary tooling base of FIG. 3A modified to accommodate use of softer materials for the base, according to various aspects of the present disclosure.

In another embodiment shown in FIG. 3B, the tooling base 301 is made of a relatively soft material and the tooling holes 307 are lined with a relatively hard bushing 313. Non-limiting examples of the relatively softer material include aluminum, iron, injection molded plastic, reinforced plastic, filled plastic, and/or combinations thereof. Non-limiting examples of a relatively harder material used for the bushings may include steel, titanium, ceramic, and—filled or reinforced—that has a hardness rating higher than that used for the base.

Figure 4:
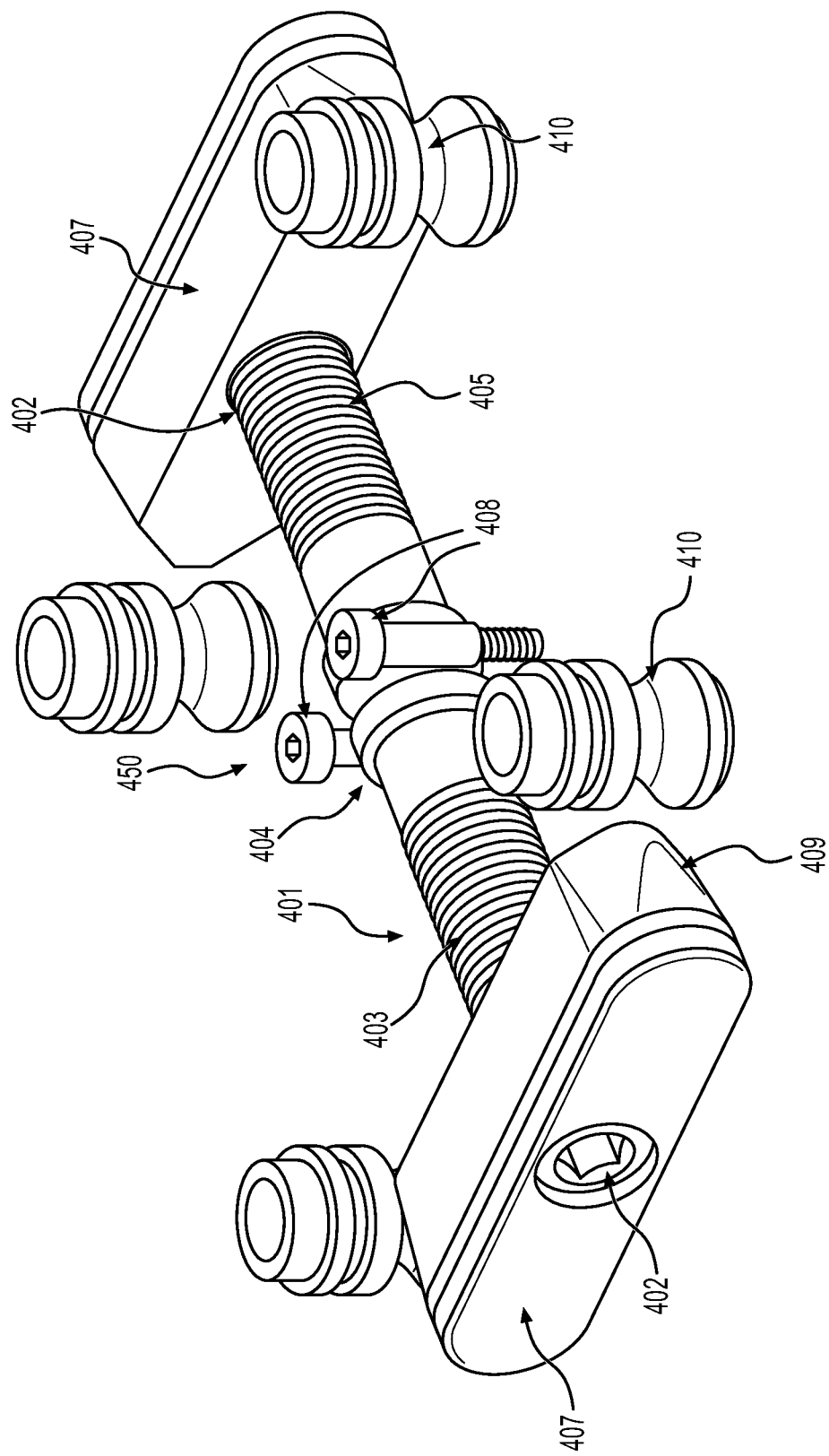
FIG. 4 depicts details of an exemplary embodiment of the internal components of the tooling base, according to various aspects of the present disclosure.

Referring now to FIG. 4, an exemplary embodiment of internal components of a tooling base are illustrated. The tooling base includes a pair of clamping fixtures 407 that are interconnected by a single threaded shaft 401. The clamping fixtures 407 are fitted to the threaded shaft 401 through threaded holes 402. Threaded shaft 401 includes a first threaded portion having left-handed threads 403 and a second threaded portion having right-handed threads 405. As a result, rotation of the shaft 401 in a first direction causes the clamping fixtures to move towards one another and rotation of the shaft in a second direction causes the clamping fixtures to move away from one another. In this embodiment, each end 409 of the clamping fixtures 407 are tapered to engage an indentation on the alignment studs, 410 thereby clamping the alignment studs 410 in place when the threaded shaft 401 is rotated to bring the clamping fixtures 407 towards one another. The tooling base 301 (not shown) further includes a stop 450 comprising ridges 404 on the threaded shaft 401 and cylindrical posts 408, which are configured to restrict the movement of the combined assembly of the alignment fixtures 407 and the shaft 401 to the width of the region between the ridges 404. Note that in this embodiment, movement of the alignment fixtures 407 by rotation of the threaded shaft 401 causes simultaneous clamping and release the alignment studs 410.

Further described below are a plurality of different types of possible securing mechanisms, i.e., the portions of the clamping fixtures that engage the indentation on the alignment studs. It is important to note that the configurations described below are not exhaustive and a skilled person will realize that other types of securing mechanisms, not explicitly described here, may also be utilized.

Figure 5:
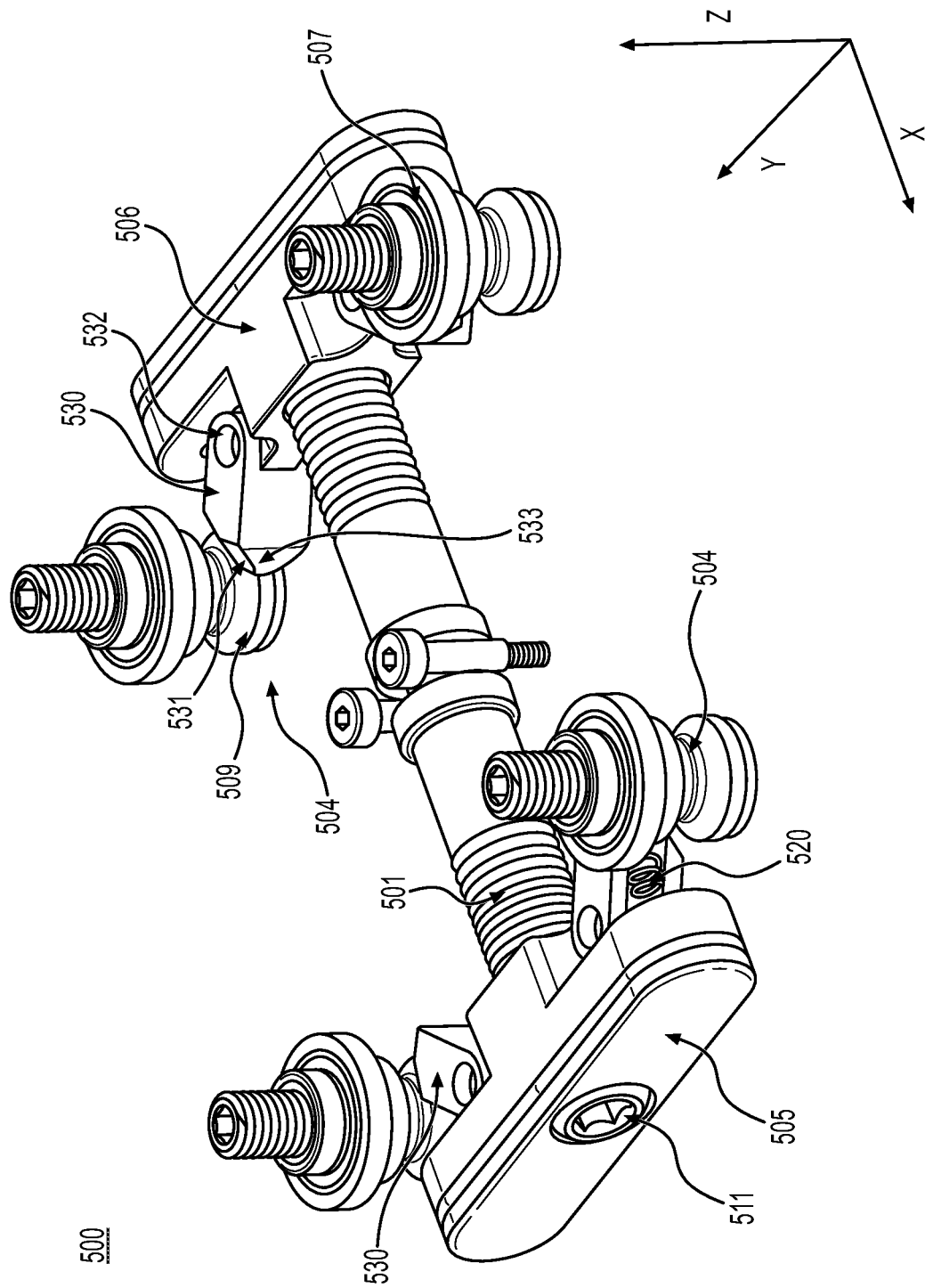
FIG. 5 depicts a top perspective view of an additional embodiment, according to various aspects of the present disclosure.

Referring now to FIG. 5, a top perspective view of an additional embodiment is illustrated, according to various aspects of the present disclosure. The base block 500 comprises clamping fixtures 505 and 506 and a threaded shaft 501. Each of clamping fixtures 505 and 506 in this embodiment comprise a threaded hole 511 and securing mechanisms composed of one or more clamping levers 530, lever hinges 532, and biasing devices 520. The threaded shaft 501 comprises threads which are configured such that rotation of the threaded shaft 501 via the threaded hole 511 causes the clamping fixtures 505 and 506 to move towards and away from each other along an X-axis defined by the length of the threaded shaft 501. One or more clamping levers 530 are rotatably attached to clamping fixtures 505 and 506 by a lever hinge 532. Movement of the levers 530 is constrained by walls (not shown here) inside the base block 500, an alignment stud 504, the lever hinge 532, and a biasing device 520. Accordingly, in some embodiments, the clamping lever 530 may rotate about the lever hinge 532 on a plane defined by the X and Y axis, but is constrained from moving in the Z-axis direction, for example, by internal walls of the base block. When the clamping fixtures 505 and 506 move towards each other, a wall impingement surface 533 of the clamping lever 530 contacts the base block 500. As the clamping fixtures 505 and 506 move closer to each other to enter a locked position, a stud engagement surface 531 of the clamping lever 530 engages an engagement surface 509 of alignment stud 504 inserted into a tooling hole 507. In some embodiments, in a locked position, the angle of the clamping lever 530 relative to an X-axis defined by length of the threaded shaft 501 may be between approximately 60 and approximately 90 degrees. The stud engagement surface 531 and the engagement surface 509 of the alignment stud 504 are configured to engage with each other to create a holding force that prevents movement of the alignment stud 504 when the clamping fixtures 505 and 506 are in a locked position. In some embodiments, the angle of the stud engagement surface 531 relative to the base block 500 and the angle of the engagement surface 509 of the alignment stud 405 relative to the base block are both approximately 45 degrees as shown further below in FIGS. 6A-6B. The biasing device 520 is configured to bias a distal end of lever 530 towards an internal wall surface (not shown here) of the base block 500. In this manner, when the clamping fixtures 505 and 506 move away from each other to enter an unlocked position, the distal ends of the clamping lever 530 are biased in a manner such that the stud engagement surface 531 of the clamping lever 530 is now within the tooling hole 507. As such, in this unlocked position, alignment studs 504 may be inserted and/or removed from the tooling hole 507 freely without contacting any portion of the clamping lever 530. While the biasing device 520 is a spring as shown in the figure, any other means or device for biasing the distal end of clamping lever 530 may be implemented, for example, pneumatic cylinders, rubber bumpers, and so forth.

Figure 6A:
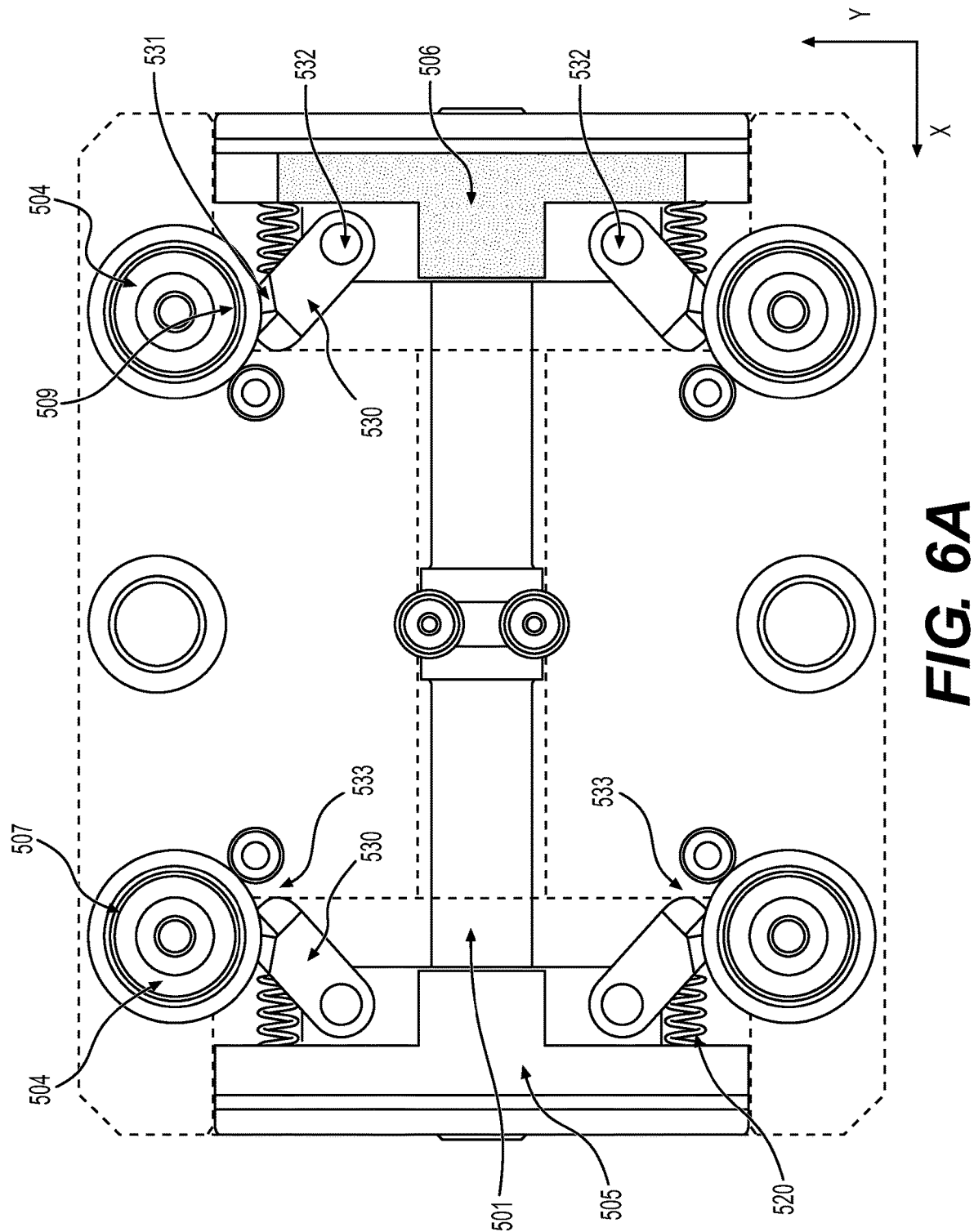
FIG. 6A depicts a top view of the additional embodiment of FIG. 5 in an unlocked (open) position, according to various aspects of the present disclosure.
Figure 6B:
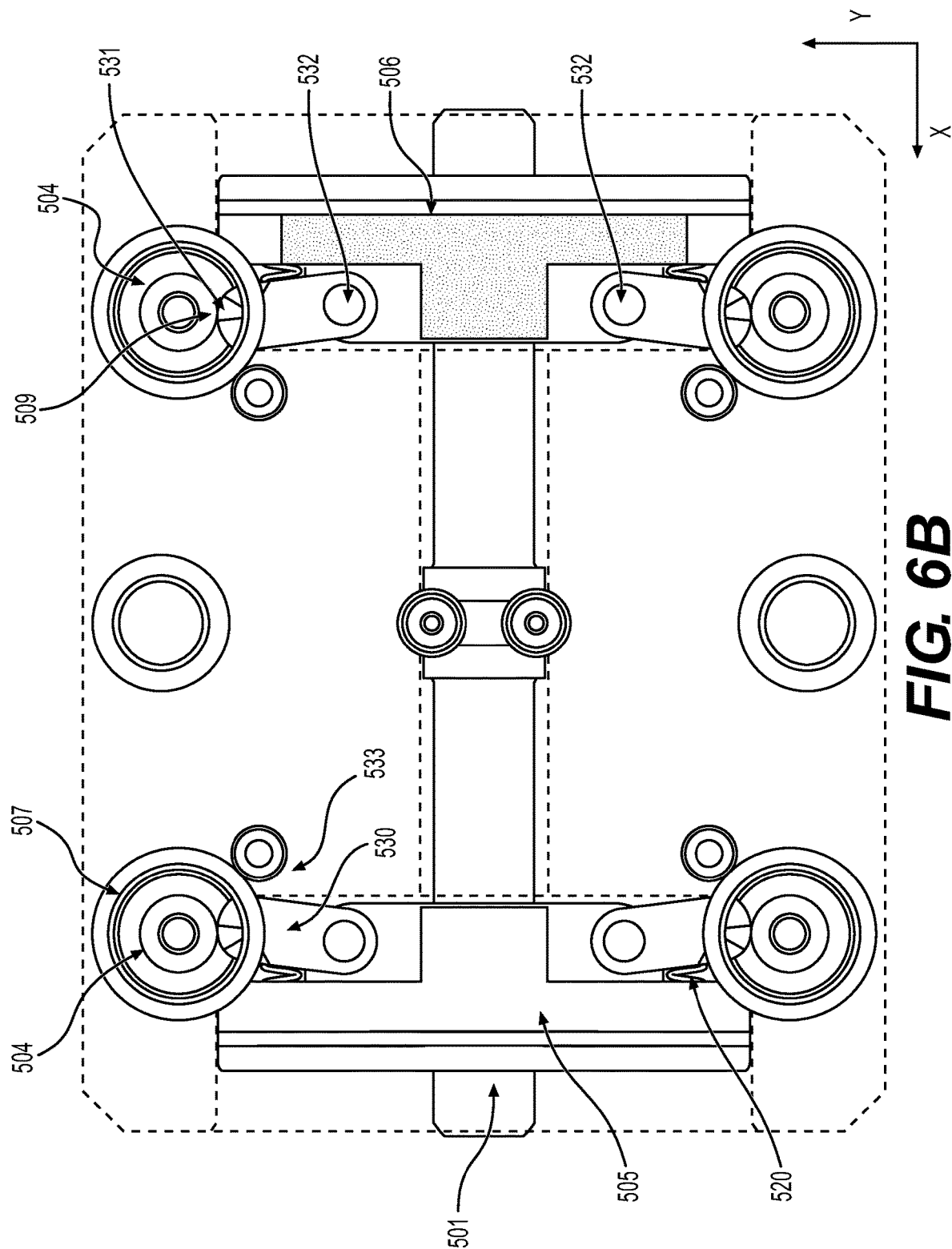
FIG. 6B depicts a top view of the additional embodiment in FIG. 5 in a locked (closed) position, according to various aspects of the present disclosure.

Referring now to FIGS. 6A and 6B, top views of the additional embodiment of FIG. 5 are illustrated in an unlocked open position and a locked closed position, respectively, according to various aspects of the present disclosure. FIG. 6A depicts a position when the clamping fixtures 505 and 506 are unlocked. In this position, one or more alignment studs 504 may be inserted or removed from one or more tooling holes 507 without contacting one or more clamping levers 530. This allows for alignment studs 504 (and corresponding tools) to be easily changed or replaced, for example, prior to beginning a new machining process. Each of the clamping levers 530 is attached at a proximal end by a lever hinge 532 to one of the clamping fixtures 505 and 506. The biasing devices 520 attached to each clamping lever 530 provide a biasing force to the distal end of the clamping lever 530, which prevents the distal end of the clamping lever 530 from inadvertently entering the tooling hole 507 and otherwise interfering with the insertion or removal of the alignment stud 504 while the clamping fixtures 505 and 506 are in the unlocked and open position.

FIG. 6B depicts the position when the clamping fixtures 505 and 506 are in a locked and closed position. Upon rotation of the threaded shaft 501, clamping fixtures 505 and 505 are moved closer to each other along the X-axis defined by the length of the threaded shaft 501. As the clamping fixtures 505 and 506 move closer to each other, the distal end of each clamping lever contacts a wall impingement surface 533 of the base block 500. As the threaded shaft 501 is further rotated and clamping fixtures 505 and 506 move further closer together, the clamping levers 530 rotate about the lever hinge 532 due to contact from the wall impingement surface 533, causing the distal end of the clamping levers 530 to move towards respective alignment studs 504 and tooling holes 507. In the locked position depicted in FIG. 6B, the stud engagement surface 531 of the clamping lever 530 is in contact with an engagement surface 509 of the alignment stud 504. In some embodiments, the contact is a line contact or a point contact. The contact between the engagement surface 509 of the alignment stud 504 and the engagement surface 531 of the clamping lever 530 prevents movement of the alignment studs 504 in all directions. As a result, a holding force is applied to the alignment studs 504 to allow for accurate machining processes.

Figure 7B:
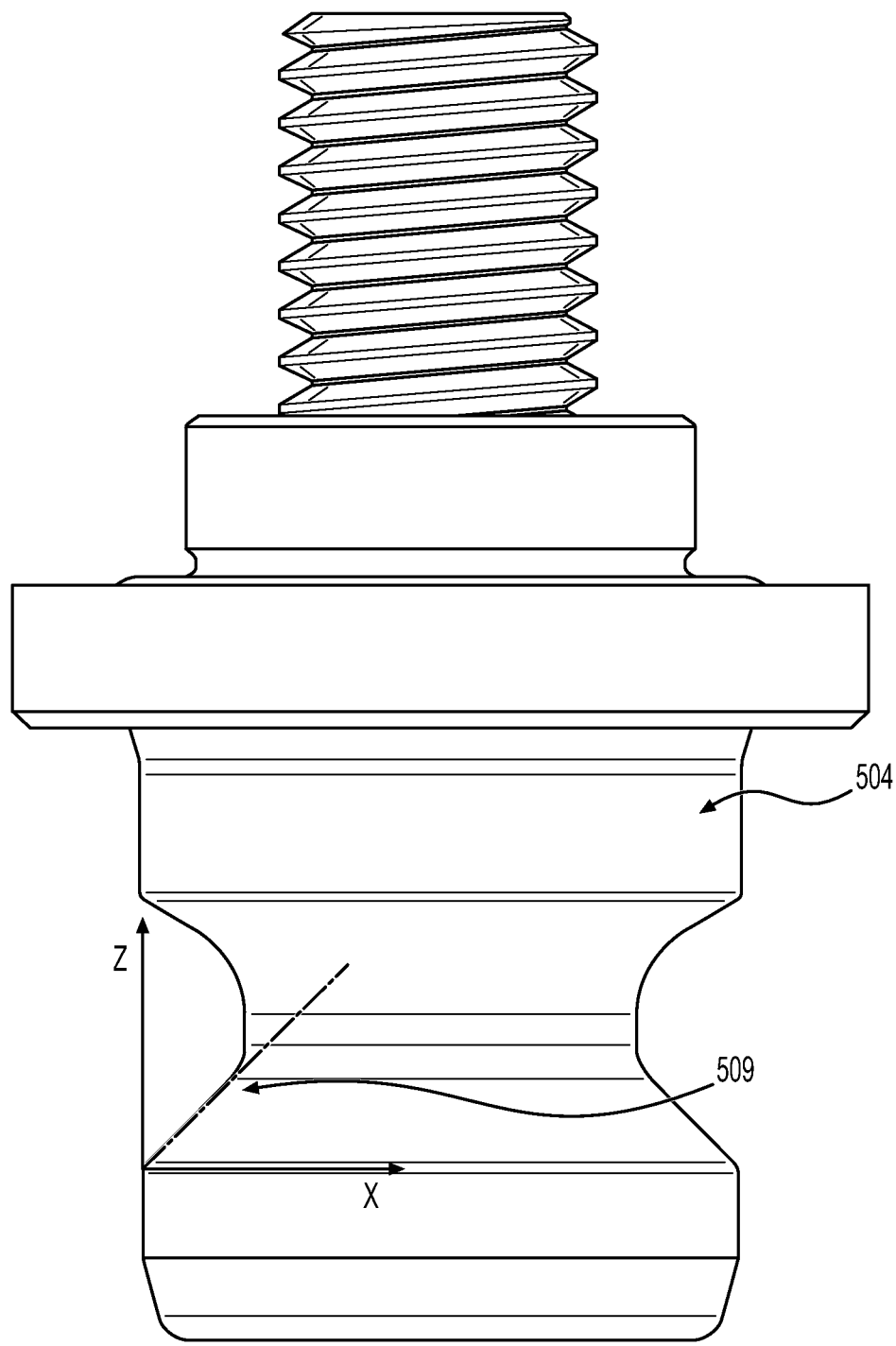
FIG. 7B depicts a side view of an alignment stud, according to various aspects of the present disclosure.
Figure 7C:
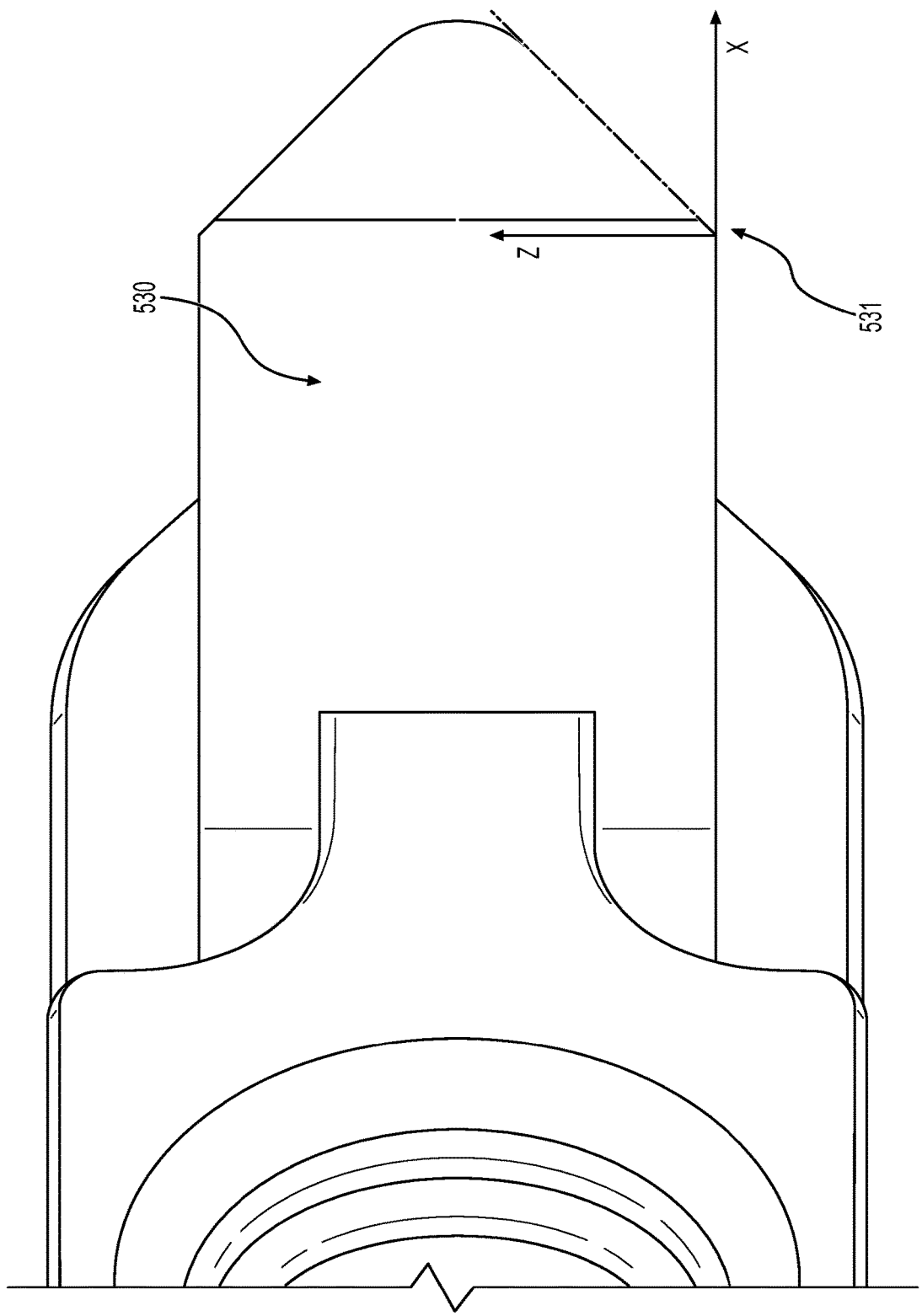
FIG. 7C depicts an additional views of a clamping lever, according to various aspects of the present disclosure

The angle of the stud engagement surface 531 and the angle of the engagement surface 509 of the alignment stud 504 may further be shaped to fit in order to allow for a stronger hold down force. For example, as shown in FIGS. 7A-C, in some embodiments, the stud engagement surface 531 may have a convex-like shape and the engagement surface 509 of the alignment stud 504 may have a concaved surface such that the stud engagement surface 531 may be accepted into the concaved surface of the engagement surface of the alignment stud 504. In some embodiments, a bottom portion of the engagement surface of the alignment stud 504 may be between approximately 0 and 90 degrees relative to an X-axis defined by the bottom surface of the stud 504. In some embodiments, as shown in FIG. 7B, the bottom portion of the engagement surface of the alignment stud 504 may be approximately 45 degrees relative to an X-axis as shown.

In some embodiments, a bottom portion of the stud engagement surface 531 of the clamping lever 530 may be between approximately 0 and 90 degrees relative to an X-axis defined by the bottom surface of the clamping lever 530. In some embodiments, as shown in FIG. 7C, the bottom portion of the stud engagement surface 531 may be approximately 45 degrees relative to an X-axis, as shown.

Figure 8:
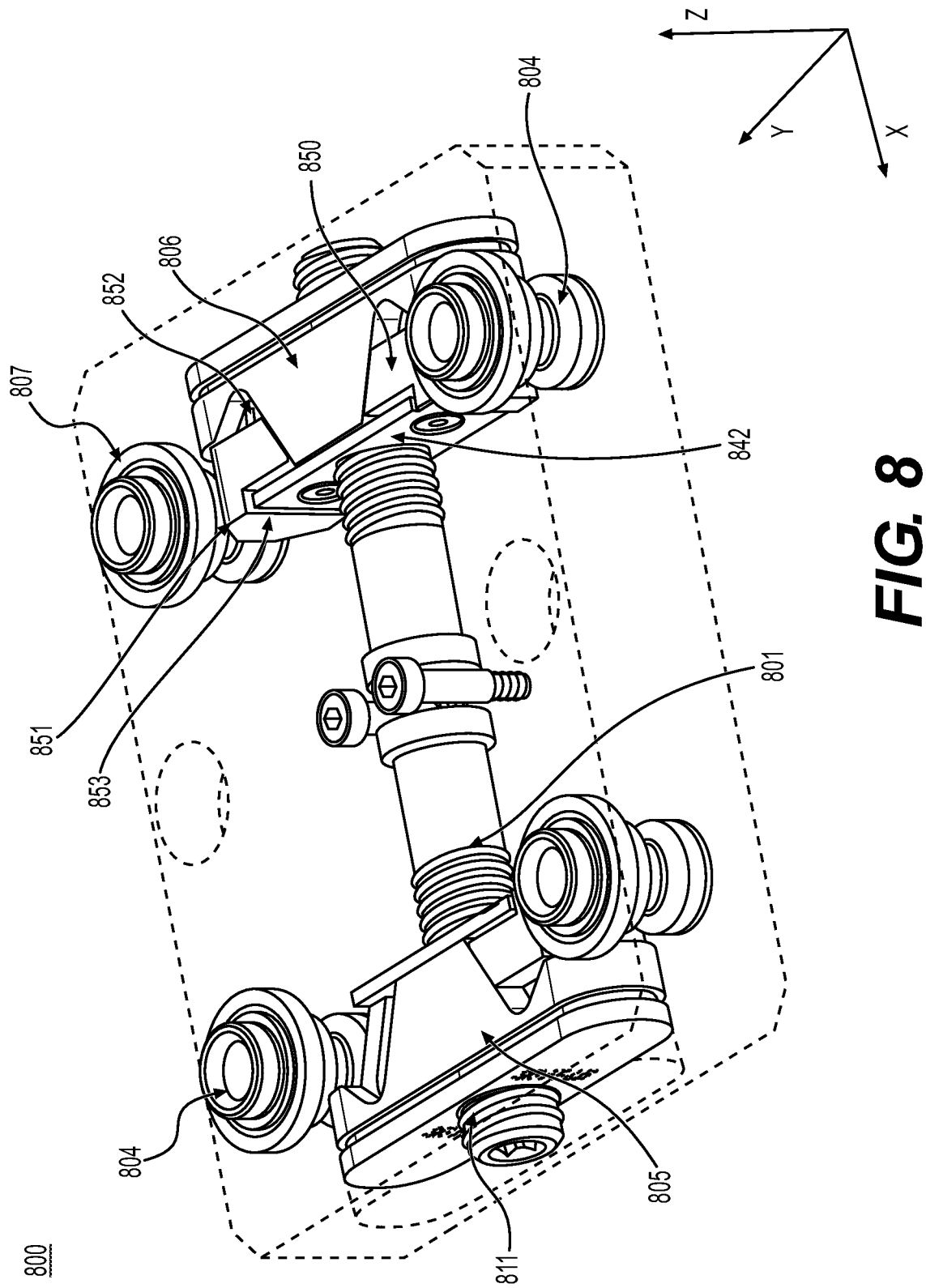
FIG. 8 depicts a top perspective view of another additional embodiment, according to various aspects of the present disclosure.

Referring now to FIG. 8, a top perspective view of another embodiment is illustrated, according to various aspects of the present disclosure. The base block 800 comprises clamping fixtures 805 and 806 and a threaded shaft 801. Each of clamping fixtures 805 and 806 in this embodiment comprise a threaded hole 811 and securing mechanisms composed of one or more slide locks 850, a biasing device 820 (not shown), and a stopper 842. The threaded shaft 801 comprises threads which are configured such that rotation of the threaded shaft 801 via the threaded hole 811 causes the clamping fixtures 805 and 806 to move towards and away from each other along an X-axis defined by the length of the threaded shaft 801. One or more slide locks 850 are attached to clamping fixtures 805 and 806 by a biasing device 820 (shown in FIG. 9A). Movement of the slide locks 850 is constrained by walls inside the base block (not shown here), an alignment stud 804, the stopper 842, a slide lock groove 852, and the biasing device 820. The slide lock groove 852 is configured to allow the slide lock 850 to move and slide as the clamping fixtures 805 and 806 move closer and farther apart from each other. Accordingly, in some embodiments, the slide lock 850 may slide forward and backwards along an X-axis defined by the threaded shaft 801. When the clamping fixtures 805 and 806 move towards each other, the head 832 of the slide lock 850 contacts the base block. When the clamping fixtures 805 and 806 further mover closer to each other, the constraints along the Z-axis and the configuration of the slide lock groove 852 cause the slide lock 850 to then move along a Y-axis perpendicular to the X-axis towards an alignment stud 804 inserted into tooling hole 807. As the clamping fixtures 805 and 806 move closer to each other to enter a locked position, a stud engagement surface 851 of the slide lock 850 engages an engagement surface 809 (not visible) of alignment stud 804 inserted into the tooling hole 807. The stud engagement surface 851 and the engagement surface 809 of the alignment stud 804 are configured to engage with each other to create a holding force that prevents movement of the alignment stud 804 when the clamping fixtures 805 and 806 are in a locked position. In some embodiments, the angle of the stud engagement surface 851 relative to the base block 800 and the angle of the engagement surface 809 of the alignment stud 804 relative to the base block 800 are both approximately 45 degrees. The biasing device 820 is configured to bias the slide lock 850 towards an internal wall surface (not shown here) of the base block 800. In this manner, when the clamping fixtures 805 and 806 move away from each other to enter an unlocked position, the slide lock 850 is biased in a manner such that the stud engagement surface 831 of the slide lock 850 is not within the tooling hole 807. As such, in this unlocked position, alignment studs 804 may be inserted and/or removed from the tooling hole 807 freely without contacting any portion of the clamping lever 830. While the biasing device 820 is a spring as shown in the figure, any other means or device for biasing slide lock 850 may be implemented.

Figure 9A:
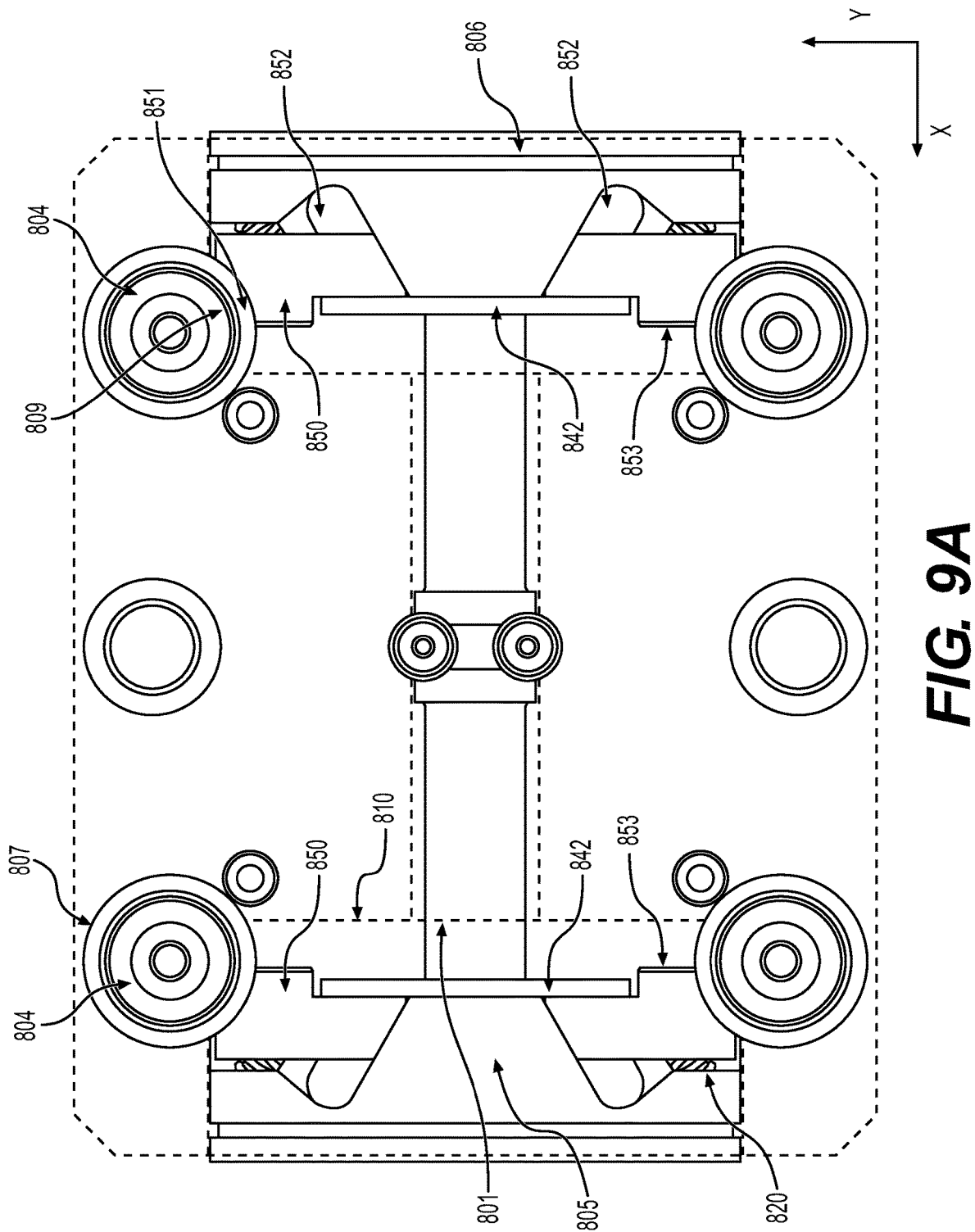
FIG. 9A depicts a top view of the additional embodiment in FIG. 8, in an unlocked (open) position, according to various aspects of the present disclosure.

Referring now to FIG. 9A, a top view of the additional embodiment in FIG. 8 is illustrated in an unlocked (open) position, according to various aspects of the present disclosure. In the unlocked position, the clamping fixtures 805 and 806 have not yet been tightened. The stud engagement surface 851 is not within the tooling hole 807 or engaged to an engagement surface 809 of alignment stud 804. The stopper 842 and the base block stop wall 810 are not in contact, while the slide lock 850 and the stopper 842 are in contact. As such, in this unlocked position, alignment studs 804 may be inserted and/or removed from the tooling hole 807 freely without contacting any portion of the slide lock 850.

Figure 9B:
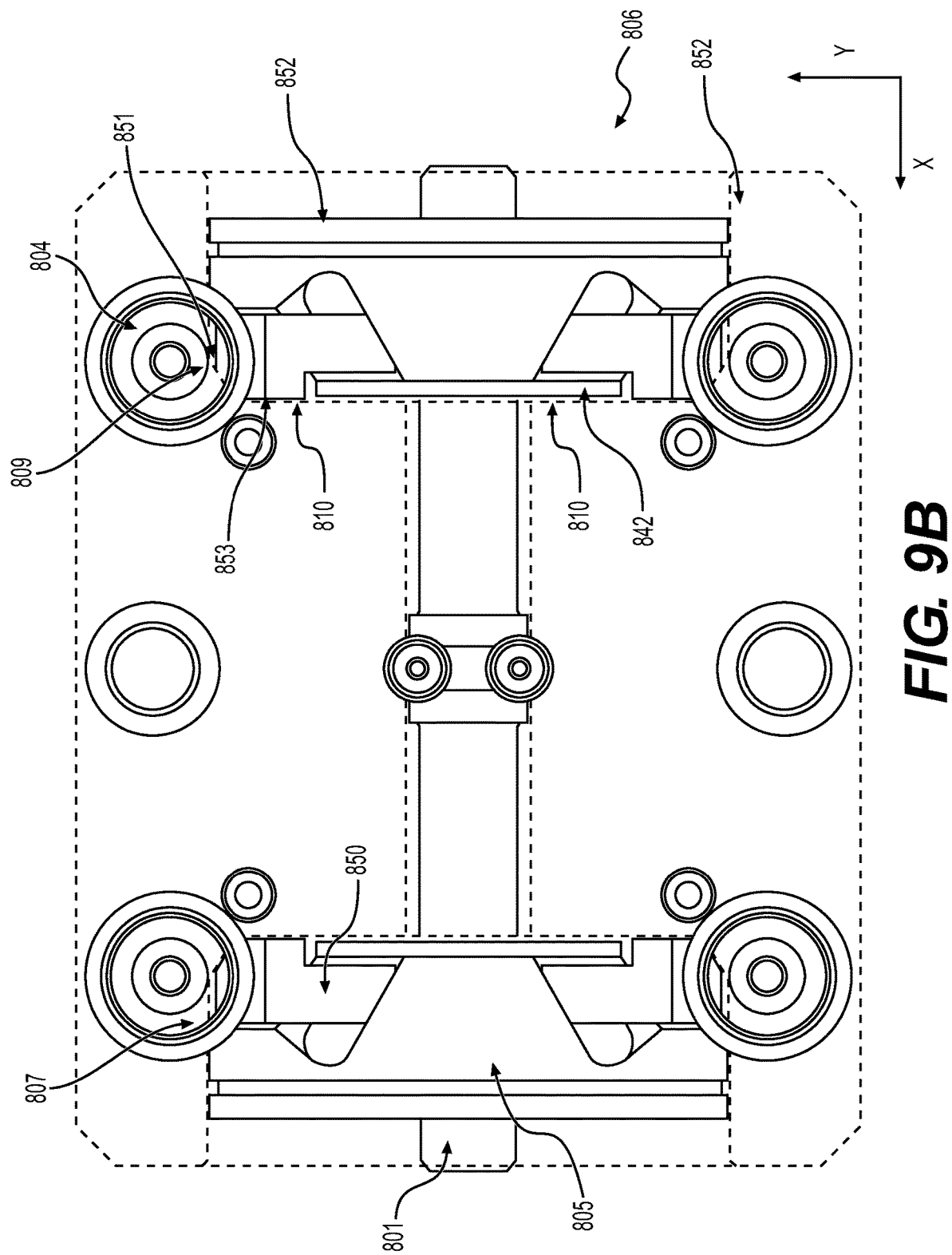
FIG. 9B depicts a top view of the additional embodiment in FIG. 8 in a locked (closed) position, according to various aspects of the present disclosure.

Referring now to FIG. 9B, a top view of the additional embodiment in FIG. 8 is illustrated in a locked (closed) position, according to various aspects of the present disclosure. As depicted, clamping fixtures 805 and 806 are in a locked position after rotation of the threaded shaft 801. The stopper 842 and base block stop wall 810 are in contact. The slide lock head 843 is also in contact with the base block stop wall 810. The stud engagement surface 851 is within the tooling hole 807 and in contact with the engagement surface 809 of the alignment stud 804. The contact between the engagement surface 809 of the alignment stud 804 and the engagement surface 851 of the slide lock 850 prevents movement of the alignment studs 804 in all directions. The slide lock groove 852 further may further largely be configured to prevent the slide lock 850 from rotating. As a result, a holding force is applied to the alignment studs 804 to allow for accurate machining processes.

Figure 9C:
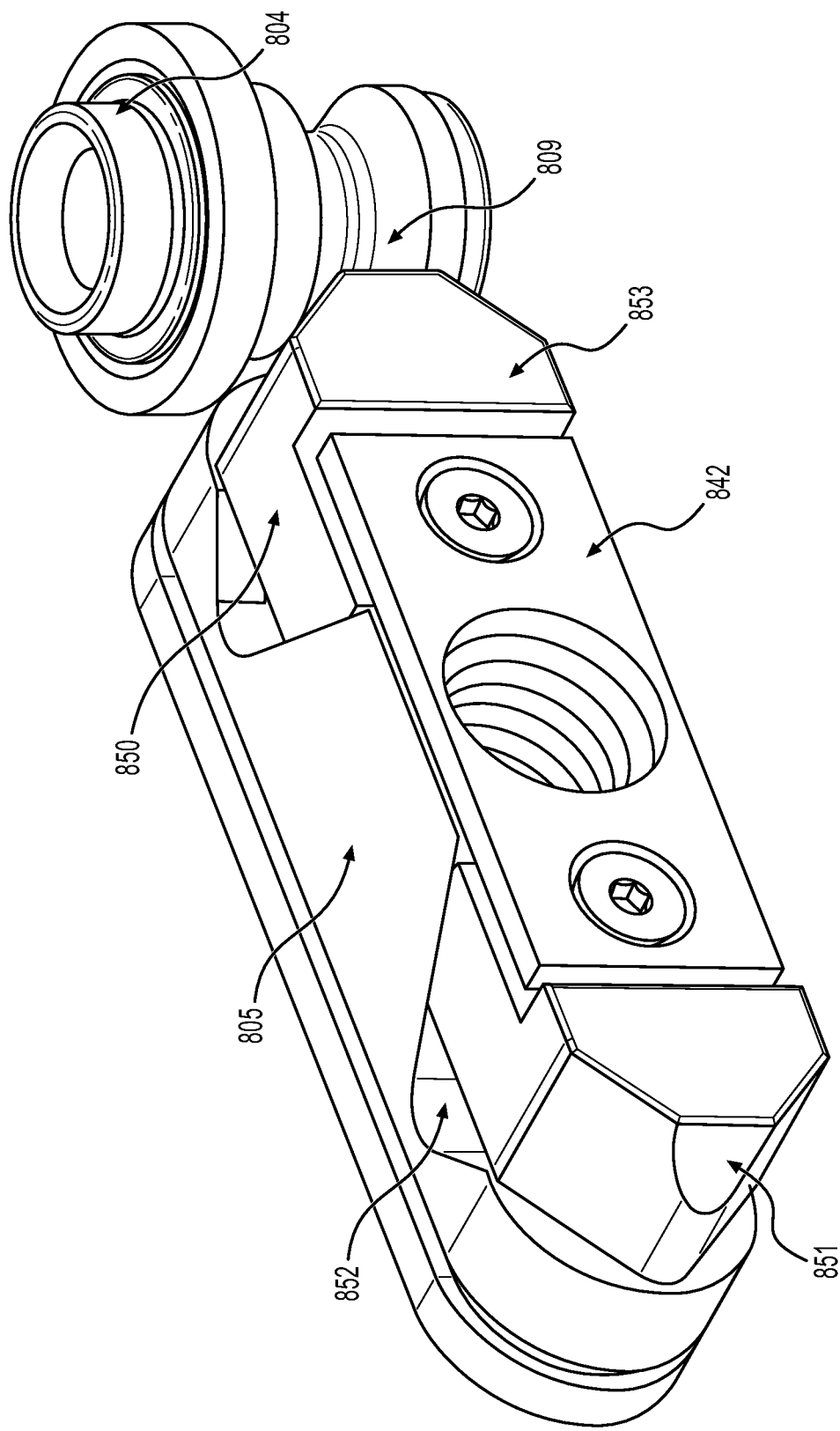
FIG. 9C depicts another view of the additional embodiment in FIG. 8, according to various aspects of the present disclosure.

Referring now to FIG. 9C, a perspective view of components of the additional embodiment depicted in FIG. 8 is provided, according to various aspects of the present disclosure. FIG. 9C depicts a perspective view of a clamping fixture 805 including a slide lock 850, a slide lock groove 852, a slide lock head 853 of the slide lock 850 including a stud engagement surface 851, a stopper 842, an alignment stud 804, and an engagement surface 809 of the alignment stud 804. As described above, in some embodiments, the stud engagement surface 851 and the engagement surface 809 may be configured to engage each other to improve a hold down force of the stud. In some embodiments, the angles of the stud engagement surface 851 and the engagement surface 809 may be adjusted to change the amount of hold down force applied to the alignment stud 804. For example, in some embodiments, a stud engagement surface 851 may have an angle that is approximately 45 degrees relative to the X and Y plane as shown in FIG. 8 which may result in a 1 to 1 force application between a force applied to the threaded shaft 801 and a force applied to the alignment stud 804. In some embodiments, the angle of the slide lock groove 852 may also be adjusted to change the amount of hold down force applied to the alignment studs. For example, a slide lock groove 852 angle that is approximately 45 degrees relative to the threaded shaft 801 may result in a 1 to 1 force application between a force applied to the threaded shaft 801 and the force applied to the alignment stud 804.

Figure 10:
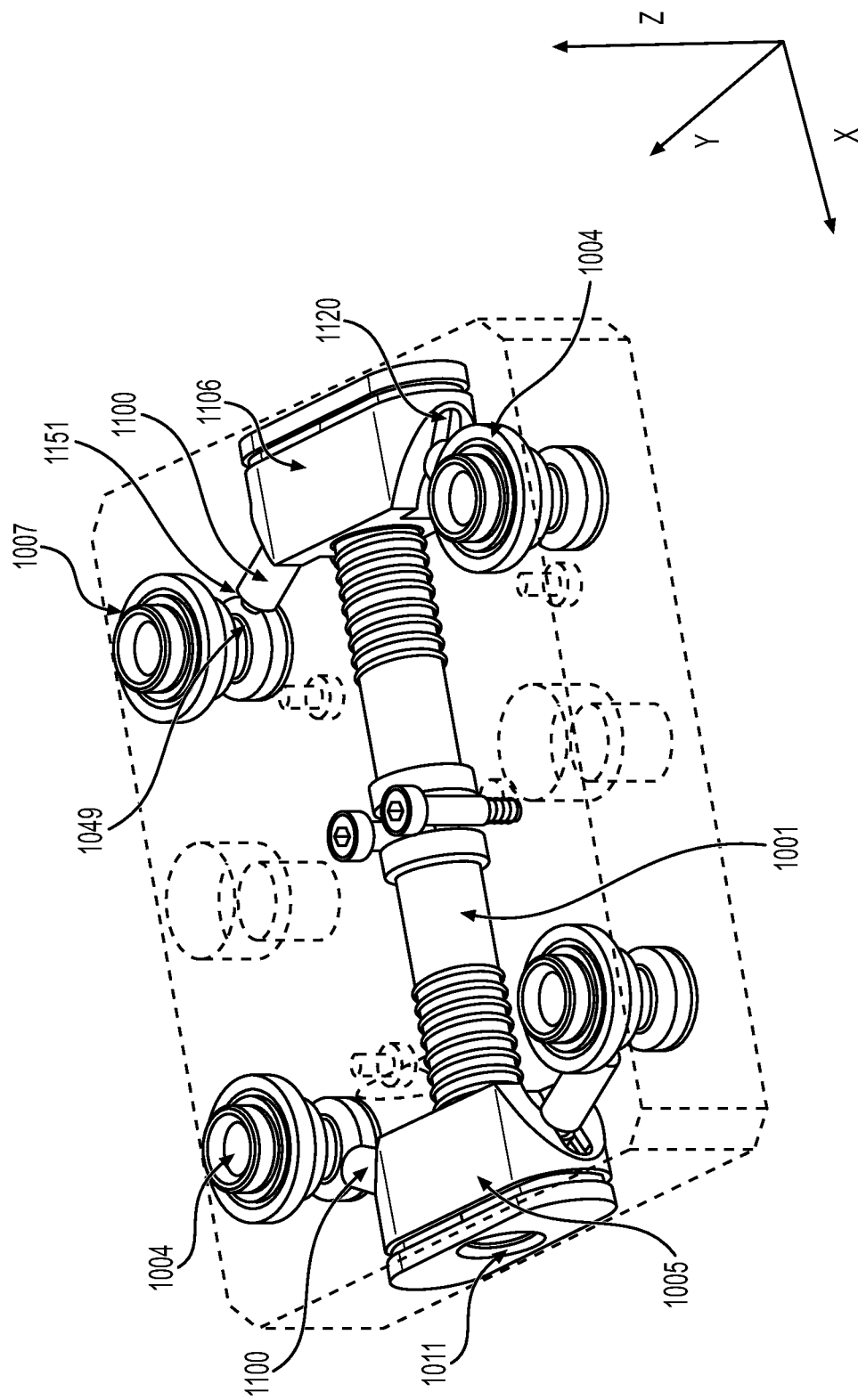
FIG. 10 depicts a top perspective view of yet another additional embodiment, according to various aspects of the present disclosure.

Referring now to FIG. 10, a perspective view of yet another additional embodiment is illustrated, according to various aspects of the present disclosure. The base housing comprises clamping fixtures 1005 and 1006 and a threaded shaft 1001. Each of the clamping fixtures 1005 and 1006 in this embodiment comprise a threaded hole 1011 and securing mechanisms composed of one or more plungers 1100. In this embodiment, as threaded shaft 1001 is rotated in a first direction, clamping fixtures 1005 and 1006 are moved closer to each other, thereby moving a corresponding plunger 1100 into the tooling hole 1007 to engage an alignment stud 1004. Conversely, as threaded shaft 1001 is rotated in a second direction, opposite the first direction, clamping fixtures 1005 and 106 are moved away from each other, thereby causing a corresponding plunger 1100 to disengage from an alignment stud 1004 and retreat from the tooling hole 1007 (if it was previously there). The clamping fixtures 1005 and 1006 may include angled plunger grooves 1120 to guide the plunger 1100 towards and away from the alignment stud 1004 as the threaded shaft 1001 is rotated.

Figure 11A:
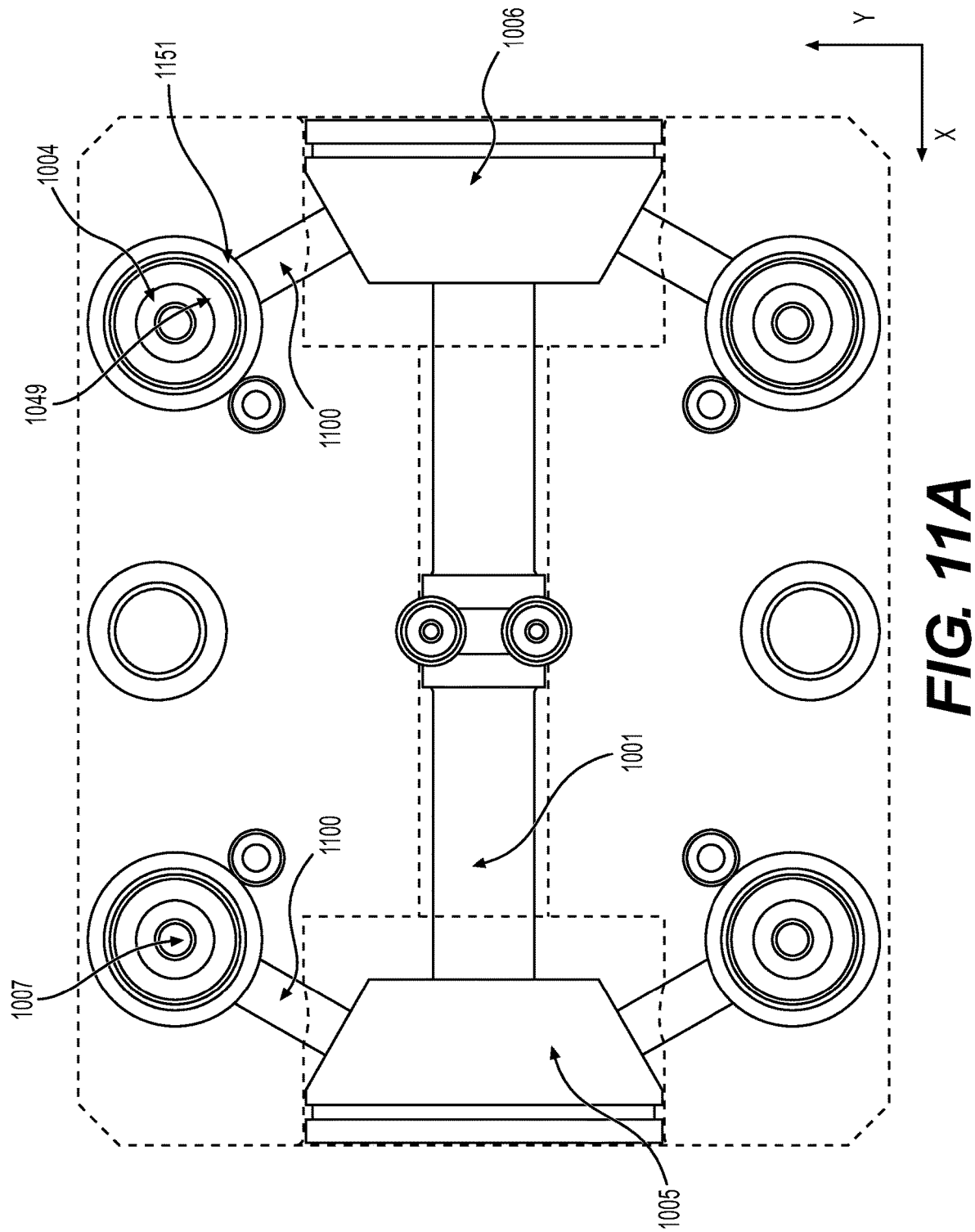
FIG. 11A depicts a top view of the additional embodiment in FIG. 10 in an unlocked (open) position, according to various aspects of the present disclosure.

Referring now to FIG. 11A, a top view of the additional embodiment depicted in FIG. 10 is illustrated in an unlocked position, according to various aspects of the present disclosure. When the threaded shaft 1001 is rotated to bring the clamping fixtures 1005 and 1006 farther apart into an open position as shown in FIG. 11A, the plunger 1100 is removed from the tooling hole 1007 and the alignment studs 1004 may be easily removed.

Figure 11B:
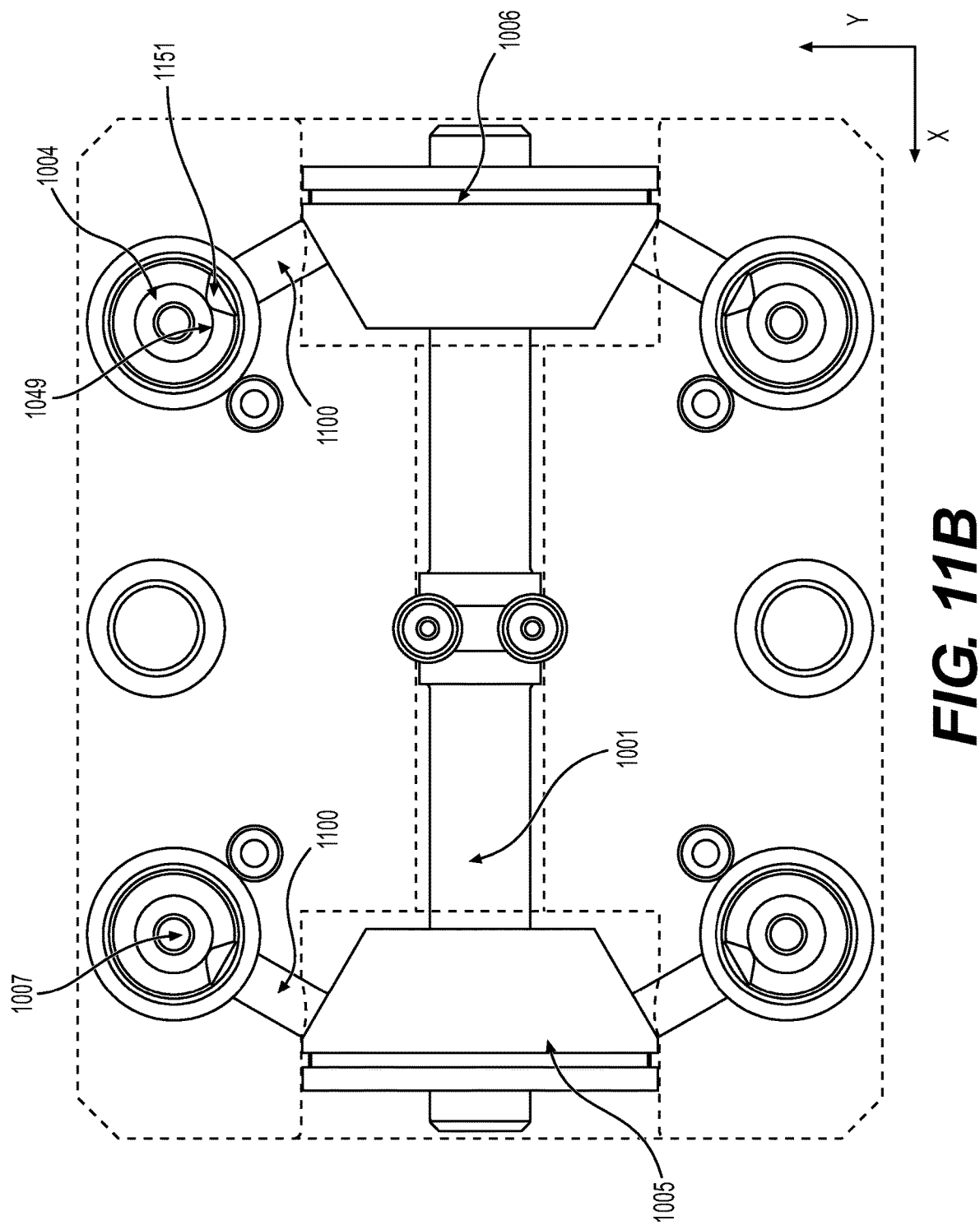
FIG. 11B depicts a top view of the additional embodiment in FIG. 10 in a locked (closed) position, according to various aspects of the present disclosure.

Referring now to FIG. 11B, a top view of the additional embodiment depicted in FIG. 10 is illustrated in a locked position, according to various aspects of the present disclosure. In the locked position, as shown in FIG. 11B, the stud engagement surface 1151 of the plunger 1100 engages the engagement surface 1049 of the alignment stud 1004 to provide a hold down force that prevents removal of the alignment stud 1004 from the tooling hole 1007.

Figure 11C:
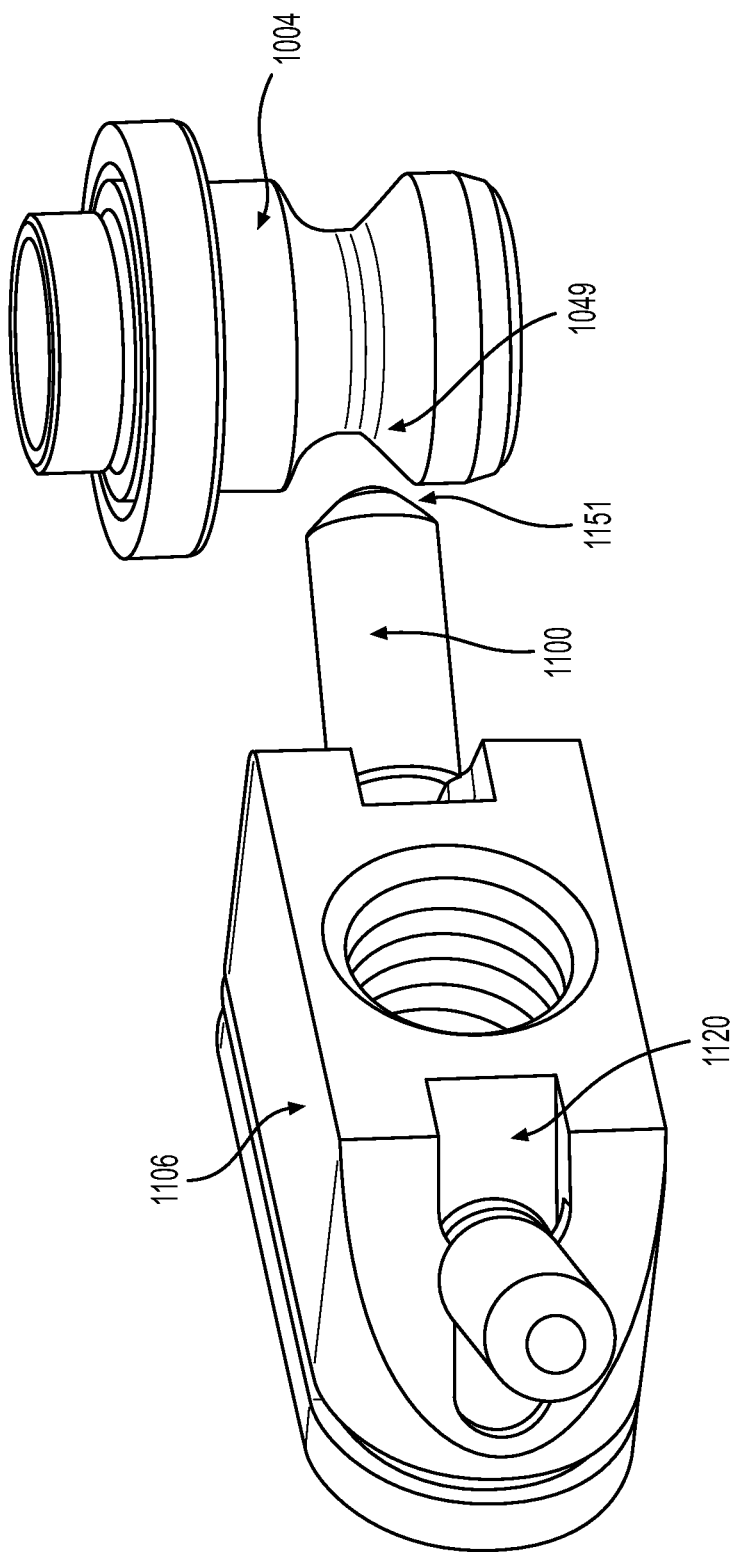
FIG. 11C depicts another view of the additional embodiment in FIG. 10, according to various aspects of the present disclosure.

Referring now to FIG. 11C, a perspective view of components of the additional embodiment depicted in FIG. 10 is illustrated, according to various aspects of the present disclosure. FIG. 11C depicts a perspective view of a clamping fixture 1106 including a plunger 1100, a plunger groove 1120, a stud engagement surface 1151 of the plunger 1100, an alignment stud 1004, and an engagement surface 1049 of the alignment stud 1004. As shown above, in some embodiments, the stud engagement surface 1151 and the engagement surface 1049 may be configured to engage each other to improve a hold down force of the stud. In some embodiments, the angles of the stud engagement surface 1151 and the engagement surface 1049 may be adjusted to change the amount of hold down force applied to the alignment stud 1004. For example, in some embodiments, a stud engagement surface 1151 angle that is approximately 45 degrees relative to the X and Y plane as shown in FIG. 10 may result in a 1 to 1 force application between a force applied to the threaded shaft 1001 and the force applied to the alignment stud 1004.

The many features and advantages of the present disclosure are apparent from the detailed specification, and thus, it is intended by the appended claims to cover all such features and advantages of the present disclosure that fall within the true spirit and scope of the disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. A tooling base for removably aligning and attaching a tooling fixture to a work surface of a machine comprising:
   a) a base housing having an interior and tooling holes, the tooling holes being configured to receive alignment studs attached to the tooling fixture, wherein each of the alignment studs comprise an indentation;
   b) a first clamping fixture that is fit inside a first hollowed region within the base housing and including a first threaded hole, and a second clamping fixture that is fit inside a second hollowed region within the base housing and including a second threaded hole;
   c) a shaft having a length and an axis along the length of the shaft, the shaft situated inside the base housing and the shaft having a first threaded region and a second threaded region, wherein the first threaded region fits inside the first threaded hole of the first clamping fixture, and the second threaded region fits inside the second threaded hole of the second clamping fixture, whereby:
      rotation of the shaft in a first direction causes the first clamping fixture and the second clamping fixture to move towards each other along the axis of the shaft; and
      rotation of the shaft in a second direction causes the first clamping fixture and the second clamping fixture to move away from each other along the axis of the shaft, the second direction being different from the first direction; and
   d) each of the first clamping fixture and the second clamping fixture comprising one or more securing mechanisms configured to:
      engage the indentation on the alignment studs of the tooling fixture upon rotation of the shaft in the first direction, thereby securing the alignment studs within the tooling holes and clamping the tooling fixture to the base housing; and
      disengage the indentation on the alignment studs of the tooling fixture upon rotation of the shaft in the second direction, thereby releasing the alignment studs within the tooling holes and unclamping the tooling fixture from the base housing;
   wherein the one or more securing mechanisms are clamping levers and wherein the clamping levers are rotatably attached to each of the first clamping fixture and the second clamping fixture via a lever hinge and wherein one or more biasing devices of the first clamping fixture and the second clamping fixture are connected to the one or more securing mechanisms to apply a biasing force to a distal end of the clamping levers.

2. The tooling base of claim 1, wherein the base housing is attached to the machine via insertion of alignment pins through one or more bolt holes in the base housing and the machine.

3. The tooling base of claim 1, wherein rotation of the shaft in the first direction causes, via movement of the first clamping fixture and the second clamping fixture in the first direction, the clamping levers to contact a wall impingement surface in the interior of the base housing that facilitates rotation of the clamping levers towards the tooling holes.

4. The tooling base of claim 3, wherein continued rotation of the shaft in the first direction results in the first clamping fixture and the second clamping fixture entering a locked position, wherein a stud engagement surface of the clamping levers in the locked position is engaged to an engagement surface of the indentation of one or more of the alignment studs inserted in the tooling hole, thereby creating a holding force that secures the tooling fixture to the base housing.

5. The tooling base of claim 4, wherein rotation of the shaft in the second direction causes, via movement of the first clamping fixture and the second clamping fixture and as a result of the biasing force to the distal end of the clamping levers, the stud engagement surface of the clamping levers to disengage from the engagement surface of the indentation of the alignment studs and the clamping levers to retreat from the tooling holes.

6. The tooling base of claim 1, wherein a magnitude of a holding force that secures the tooling fixture to the tooling base is influenced by a first angle of a stud engagement surface of the one or more securing mechanisms and a second angle of an engagement surface of the indentation.

7. The tooling base of claim 6, wherein the first angle is defined by a bottom portion of the stud engagement surface of the securing mechanisms relative to an X-axis and wherein the second angle is defined by a bottom portion of the engagement surface of the alignment studs relative to the X-axis.

8. The tooling base of claim 7, wherein the first angle and the second angle are about 45 degrees.

9. The tooling base of claim 6, wherein the stud engagement surface is convex shape and the engagement surface is a concave surface.

10. A tooling base for removably aligning and attaching a tooling fixture to a work surface of a machine comprising:
   a) a base housing having an interior and tooling holes, the tooling holes being configured to receive alignment studs attached to the tooling fixture, wherein each of the alignment studs comprise an indentation;

b) a first clamping fixture that is fit inside a first hollowed region within the base housing and including a first threaded hole, and a second clamping fixture that is fit inside a second hollowed region within the base housing and including a second threaded hole;

c) a shaft having a length and an axis along the length of the shaft, the shaft situated inside the base housing and the shaft having a first threaded region and a second threaded region, wherein the first threaded region fits inside the first threaded hole of the first clamping fixture, and the second threaded region fits inside the second threaded hole of the second clamping fixture, whereby:

rotation of the shaft in a first direction causes the first clamping fixture and the second clamping fixture to move towards each other along the axis of the shaft; and rotation of the shaft in a second direction causes the first clamping fixture and the second clamping fixture to move away from each other along the axis of the shaft, the second direction being different from the first direction; and d) each of the first clamping fixture and the second clamping fixture comprising one or more securing mechanisms configured to:

engage the indentation on the alignment studs of the tooling fixture upon rotation of the shaft in the first direction, thereby securing the alignment studs within the tooling holes and clamping the tooling fixture to the base housing; and disengage the indentation on the alignment studs of the tooling fixture upon rotation of the shaft in the second direction, thereby releasing the alignment studs within the tooling holes and unclamping the tooling fixture from the base housing;

wherein the one or more securing mechanisms are slide locks and wherein the slide locks are attached to each of the first clamping fixture and the second clamping fixture via a biasing device.

11. The tooling base of claim 10, wherein rotation of the shaft in the first direction causes, via movement of the first clamping fixture and the second clamping fixture towards each other, heads of the slide locks and a stopper of the first clamping fixture and the second clamping fixture to contact a block stop wall in the interior of the base housing that, in conjunction with a configuration of slide lock grooves of the first clamping fixture and the second clamping fixture that contain a portion of the slide locks, facilitates slidable movement of the slide locks toward the tooling holes.

12. The tooling base of claim 11, wherein continued rotation of the shaft in the first direction results in a locked position of the first clamping fixture and the second clamping fixture, wherein a stud engagement surface of the slide locks in the locked position is engaged to an engagement surface of the indentation of the alignment studs inserted in the tooling holes, thereby creating a holding force that secures the tooling fixture to the base housing.

13. The tooling base of claim 12, wherein rotation of the shaft in the second direction causes, via movement of the first clamping fixture and the second clamping fixture away from each other and as a result of a biasing force on the slide locks, the stud engagement surface of the slide locks to disengage from the engagement surface of the indentation of the alignment studs and the slide locks to retreat from the tooling holes.

14. The tooling base of claim 10, wherein the base housing is attached to the machine via insertion of alignment pins through one or more bolt holes in the base housing and the machine.

15. A tooling base for removably aligning and attaching a tooling fixture to a work surface of a machine comprising:

a) a base housing having an interior and tooling holes, the tooling holes being configured to receive alignment studs attached to the tooling fixture, wherein each of the alignment studs comprise an indentation;

b) a first clamping fixture that is fit inside a first hollowed region within the base housing and including a first threaded hole, and a second clamping fixture that is fit inside a second hollowed region within the base housing and including a second threaded hole;

c) a shaft having a length and an axis along the length of the shaft, the shaft situated inside the base housing and the shaft having a first threaded region and a second threaded region, wherein the first threaded region fits inside the first threaded hole of the first clamping fixture, and the second threaded region fits inside the second threaded hole of the second clamping fixture, whereby:

rotation of the shaft in a first direction causes the first clamping fixture and the second clamping fixture to move towards each other along the axis of the shaft; and rotation of the shaft in a second direction causes the first clamping fixture and the second clamping fixture to move away from each other along the axis of the shaft, the second direction being different from the first direction; and d) each of the first clamping fixture and the second clamping fixture comprising one or more securing mechanisms configured to:

engage the indentation on the alignment studs of the tooling fixture upon rotation of the shaft in the first direction, thereby securing the alignment studs within the tooling holes and clamping the tooling fixture to the base housing; and disengage the indentation on the alignment studs of the tooling fixture upon rotation of the shaft in the second direction, thereby releasing the alignment studs within the tooling holes and unclamping the tooling fixture from the base housing;

wherein the one or more securing mechanisms are plungers and wherein the plungers are attached to each of the first clamping fixture and the second clamping fixture.

16. The tooling base of claim 15, wherein rotation of the shaft in the first direction facilitates, via movement of the first clamping fixture and the second clamping fixture towards each other, movement of the plungers toward the tooling holes, wherein angled plunger grooves guide the movement of the first clamping fixture and the second clamping fixture.

17. The tooling base of claim 16, wherein continued rotation of the shaft in the first direction results in a locked position of the first clamping fixture and the second clamping fixture, wherein a stud engagement surface of the plungers in the locked position is engaged to an engagement surface of the indentation of the alignment studs inserted in the tooling holes, thereby creating a holding force that secures the tooling fixture to the base housing.

18. The tooling base of claim 17, wherein rotation of the shaft in the second direction causes, via movement of the first clamping fixture and the second clamping fixture towards each other and via guidance of the angled plunger grooves, the stud engagement surface of the plungers to disengage from the engagement surface of the indentation of the alignment studs and the plungers to retreat from the tooling holes.

19. The tooling base of claim 15, wherein the base housing is attached to the machine via insertion of alignment pins through one or more bolt holes in the base housing and the machine.

* * * * *